US007181692B2

(12) United States Patent
Siegel

(10) Patent No.: US 7,181,692 B2
(45) Date of Patent: Feb. 20, 2007

(54) METHOD FOR THE AUDITORY NAVIGATION OF TEXT

(76) Inventor: Steven H. Siegel, 358 7th Ave., PMB 123, Brooklyn, NY (US) 11215

( * ) Notice: Subject to any disclaimer, the term of this patent is extended or adjusted under 35 U.S.C. 154(b) by 654 days.

(21) Appl. No.: 10/167,869

(22) Filed: Jun. 11, 2002

(65) Prior Publication Data

US 2003/0046082 A1 Mar. 6, 2003

Related U.S. Application Data

(60) Continuation-in-part of application No. 09/572,758, filed on May 16, 2000, now Pat. No. 6,442,523, which is a continuation-in-part of application No. 09/428,201, filed on Oct. 27, 1999, now Pat. No. 6,148,286, which is a division of application No. 09/303,165, filed on Apr. 30, 1999, now Pat. No. 6,009,397, which is a division of application No. 09/136,651, filed on Aug. 19, 1998, now Pat. No. 5,953,692, which is a division of application No. 08/485,164, filed on Jun. 7, 1995, now Pat. No. 5,799,267, which is a continuation-in-part of application No. 08/278,928, filed on Jul. 22, 1994, now abandoned.

(51) Int. Cl.
*G06F 3/00* (2006.01)
(52) U.S. Cl. .................. 715/727; 715/706; 715/856
(58) Field of Classification Search ................ 715/706, 715/727, 728, 856
See application file for complete search history.

(56) References Cited

U.S. PATENT DOCUMENTS

| 5,203,705 | A | | 4/1993 | Hardy et al. ................. 436/169 |
|---|---|---|---|---|
| 5,223,828 | A | | 6/1993 | McKiel .................. 340/825.19 |
| 5,287,102 | A | | 2/1994 | McKiel .................. 340/825.19 |
| 5,408,655 | A | * | 4/1995 | Oren et al. .............. 715/501.1 |
| 5,429,513 | A | | 7/1995 | Diaz-Plaza .................. 434/167 |
| 5,682,469 | A | * | 10/1997 | Linnett et al. .............. 345/473 |
| 5,781,179 | A | * | 7/1998 | Nakajima et al. ........... 345/157 |
| 5,886,683 | A | | 3/1999 | Tognazzini et al. ......... 715/700 |
| 5,899,975 | A | | 5/1999 | Nielsen .................... 704/207.1 |

(Continued)

OTHER PUBLICATIONS

"A to Zap!" Screen Print and Program Manual by Sunburst Communication, 1995, 7 pp.

(Continued)

*Primary Examiner*—Kieu D. Vu
(74) *Attorney, Agent, or Firm*—RatnerPrestia

(57) ABSTRACT

A method of navigating textual information via auditory indicators is provided. Through the pervasive and immediate articulation of virtually all textual elements in response to a comparatively passive action, such as a selection device rollover, a user may quickly peruse titles, headings, list items, and so on, as well as emphasized text, paragraphs, captions, and virtually any unit of visually contiguous text. A user may also hear a particular selected word via a slightly more active action, such as clicking a mouse button. Via use of this method, a child, or other user who may understand a language, but not be able to recognize its orthography, may successfully and easily navigate textual documents. The method also resumes articulation of text that has been stopped due to a passive deindication. The articulation is restarted approximately at the word where it was stopped.

3 Claims, 15 Drawing Sheets

U.S. PATENT DOCUMENTS

| | | | | |
|---|---|---|---|---|
| 5,903,266 | A * | 5/1999 | Berstis et al. | 715/708 |
| 5,983,181 | A * | 11/1999 | Yamazaki | 704/260 |
| 5,991,781 | A | 11/1999 | Nielsen | 715/513 |
| 6,046,722 | A | 4/2000 | McKiel | 715/862 |
| 6,052,663 | A | 4/2000 | Kurzweil et al. | 704/260 |
| 6,075,968 | A | 6/2000 | Morris et al. | 434/350 |
| 6,085,161 | A | 7/2000 | MacKenty et al. | 704/270 |
| 6,088,675 | A | 7/2000 | MacKenty et al. | 704/270 |
| 6,144,377 | A | 11/2000 | Oppermann et al. | 715/744 |
| 6,340,977 | B1 * | 1/2002 | Lui et al. | 715/709 |
| 6,404,442 | B1 * | 6/2002 | Hilpert et al. | 715/727 |
| 6,580,416 | B1 * | 6/2003 | Gardner | 345/157 |
| 6,624,826 | B1 * | 9/2003 | Balabanovic | 715/727 |
| 6,952,207 | B1 * | 10/2005 | Santodomingo et al. | 345/428 |
| 2002/0133521 | A1 * | 9/2002 | Campbell et al. | 707/526 |
| 2002/0178007 | A1 * | 11/2002 | Slotznick et al. | 704/270.1 |

OTHER PUBLICATIONS

Screen Print for Microsoft Works 1993 Microsoft Corporation, 3 pp.

Richard S. Schwerdtfeger, Making the GUI Talk, Dec. 1991, p. 118.

"Heartsoft, Inc. to Exhibit Its New Secure Children's Web Browser at NECC, Atlanta" Company Press Release, Jun. 27, 2000, pp. 1-3, http://biz.yahoo.com/bw/000627/ok_heartso.html.

"Crayon Crawler User Manual", Copyright 2000, 1st Net Technologies, Inc., pp. 1-16, http://www.crayoncrawler.com/pinstructions.html.

"Internet Safari", Copyright 1999, Heartsoft, Inc., pp. 1-2, http://www.internet-safari.com/browser2.htm.

"Children Browser.com Let Children Browse the Web Safely", Copyright 1998-2000,ChildrenBroswer.com and eCapital Group, Inc., pp. 1-2, http://www.chibrow.com/admin/features.

"Speak It!", Copyright 2000 by Don Kennedy, pp. 1-8, http://www.trav-tech.com/SpeakIt.html.

"SPI", Software Patent Institute Database of Software Technologies, Copyright 1995-1998 Software Patent Institute, http://m.spi.org/cgi-bin/newqry?IS...ec=1&submit=seeit&csum=14717172825.

H. Marais, "WebL—A Programming Language for the Web", pp. 1-16, 75-77, 1998-1999.

"pwWebSpeak™ User Guide", Release 1.4, pp. 1-50, Copyright 1995, 1996, 1997, The Productivity Works, Inc.

"outSpoken 8.0 for Macintosh User Manual", pp. 1-69, ALVA Access Group, Inc.

J. Prelutsky, "The New Kid On the Block", Liner notes from CD Rom.

http://www.simtalk.com.

http://www.simtalk.com/webreader/instrucitons.html.

http://www.simtalk.com/webreader/practice.html.

"Reading, writing and computers", Lifestyles, Sun News, Oct. 27-30, 1990, 1 pp.

Said, Carol, Sound Toy: "Playing the digital blues", MacWeek, vol. 8, No. 43; p. 20; Sep. 31, 1994.

* cited by examiner

METHOD FOR THE AUDITORY NAVIGATION OF TEXT

This application is a continuation-in-part of U.S. patent application Ser. No. 09/572,758 filed May 16, 2000 now U.S. Pat. No. 6,442,523 which is a continuation-in-part of U.S. patent application Ser. No. 09/428,201 filed Oct. 27, 1999, now U.S. Pat. No. 6,148,286, which is a division of U.S. patent application Ser. No. 09/303,165 filed Apr. 30, 1999, now U.S. Pat. No. 6,009,397, which is a division of U.S. patent application Ser. No. 09/136,651 filed Aug. 19, 1998 now U.S. Pat. No. 5,953,692, which is a division of U.S. patent application Ser. No. 08/485,164 filed Jun. 7, 1995 now U.S. Pat. No. 5,799,267, which is a continuation in part of U.S. patent application Ser. No. 08/278,928 filed Jul. 22, 1994, abandoned.

FIELD OF THE INVENTION

The present invention relates to the field of educational tools generally, and specifically to educational tools for individuals with limited ability to read.

BACKGROUND

Computer technology has become ubiquitous in our society. Computers are increasingly used in the workplace, in the home and at schools. Many applications for computer technology exist which increase productivity by performing, with minimal intervention or direction, a number of repetitious mechanical tasks that are a necessary part of the more complex tasks which are performed every day in our society.

To effectively interact with a computer application using either keyboard or a graphical user interface (GUI), a user must have a good working knowledge of the natural language used in the interface of the applications. Persons who cannot read a language, either because they do not yet possess the necessary basic skills due to their age or development, or because they are not familiar with the natural language in its graphical form, are at a disadvantage using this type of a user interface.

Graphical user interfaces for some types of programs, both in commercial and educational applications, have attempted to fill this gap by providing selection based on the first letter of a word or by using a letter-based menu selection system to advance through a set of words. In response to a selected letter, these systems may display a group of words having the same first letter. An example of the former is the Index function in the Help menu of the Microsoft Excel® spreadsheet program.

While this type of interface does make these applications somewhat more accessible to individuals who are unfamiliar with the orthography of a language, it is not sufficient to allow one with some language skills but little or no orthographic knowledge to effectively use the application.

SUMMARY OF THE INVENTION

When a literate adult reader looks at text, he or she may scan, or visually "navigate" the text. For example, when looking at a newspaper, one may navigate a page, and select an article to read because of titles, headings, bylines, bold, italicized, or other special words that catch the eye, and were typically written intentionally to catch the eye. Additionally, a literate adult reader, after noticing emphasized words (or for any other reason), may elect to read adjacent words or any particular word. On the other hand, when a pre-literate child looks at text, he or she is typically capable of the same navigation: special words will catch the eye and be noticed, and the child may further elect to look at an adjacent (or other) word. But the similarity ends there, because although he or she may notice the same special words, these words cannot be read. Thus, a pre-literate child, an individual with no or minimal understanding of a language in its orthographic form (but knowledge of the language in its spoken form), or an individual with certain impairments, may not have even a clue as to the contents of a textual passage. They can see the indicators, but can not understand them. If a child were to be given this ability, worlds of information would become available. The ability to distinguish the emphasized from the normal is there; giving children the ability to exploit this distinction changes everything. The present invention provides this ability.

It provides pervasive and immediate articulation of virtually all textual elements in response to a comparatively passive action, such as a selection device rollover, which creates a paradigm, that, rather than point-and-click, may be thought of as point, receive feedback, select. Point-and-click basically presumes that the user can read, and is aware of the selection before moving a pointing device to a selection. This technique provides children in particular, as well as others with limited textual knowledge of a language, or an impairment, the ability to peruse with their ears what readers peruse with their eyes.

The present invention is embodied in a method for the auditory navigation of displayed text. According to this method, a plurality of words are displayed including at least one unit of contiguous text. Next, the method receives a first indication of a first word of the plurality of words, the first word being contained within a at least one unit of contiguous text. Responsive to the first indication, the method produces an auditory signal corresponding to a recitation of the first unit of contiguous text. The method receives a second indication of a second word of the plurality of words, the second word being contained within the at least one unit of contiguous text. Responsive to the second indication, the method produces an auditory signal corresponding to the pronunciation of the second indicated word. The method also resumes articulation of text that has been stopped due to a passive deindication. The articulation is restarted approximately at the word where it was stopped.

INTRODUCTION

Figure 1:
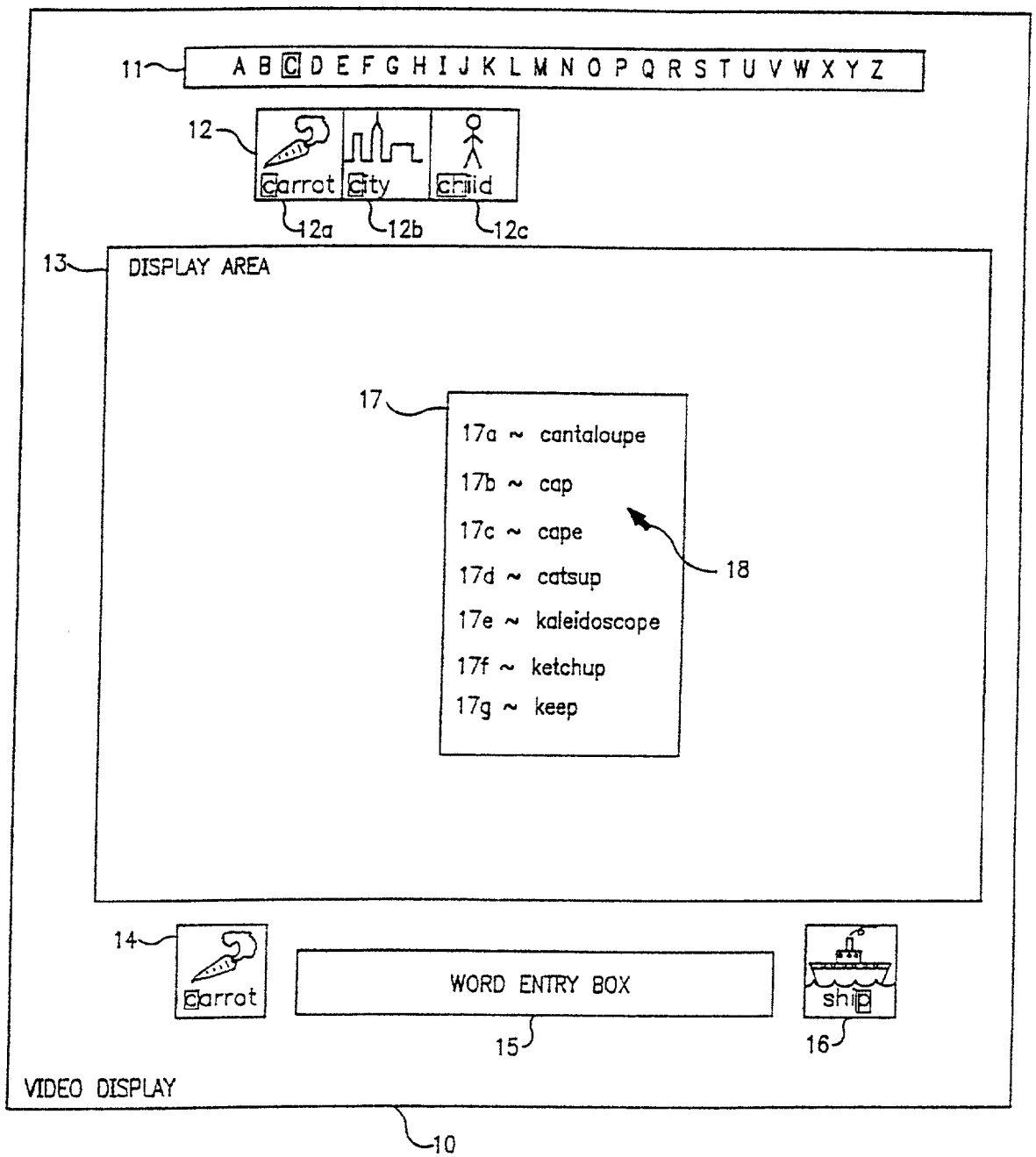
FIG. 1 shows a computer video display executing a process according to the present invention within a software program.

The present invention is embodied in a method and apparatus that enables young, pre-reading children to use components of written, phonetic or phonemic representations of language for communication. It may be implemented in software, as a mechanical device, as a dedicated electronic device, or as a combination of the three.

The apparatus (hereafter referred to as the "Phonic Engine") allows children (and other users) to convert their minimal phonological knowledge into written language or make selections of items represented by words using only minimal language components. The inventor has discovered that the following two concepts can be effectively paired/combined to provide an unexpected result:

(1) phonetic/phonemic knowledge of initial and final sounds are among the first bits of language knowledge acquired; and (2) Two bits of orthographic or phonological information about a word or group of words provides sufficient information to select a perusable set of entries containing that word or group of words, from a suitable larger set of entries. That is, early pre-reading phonic knowledge or basic orthographic knowledge may be mapped to criteria which are then converted into a word or group of words, such as a title.

For example, a 5000 entry children's software dictionary, encyclopedia, or other work may be used (hereafter referred to as "the database"). It is assumed that there are approximately 44 phonemes included in the words in the database (corresponding to the number of phonemes in the English language). For purposes of estimation, it is further assumed that initial and final phonemes are randomly distributed among the entry headings. (A database having this characteristic could be built intentionally.) For this example, specifying initial and final phonemes narrows down the 5000 entries to (5000/44)/44≈2.58 (mean average). If these entries are then presented via spoken words and/or pictures, a child can easily select the one that he or she intends to select.

Hereafter, a sound is indicated by enclosing a letter, blend, prefix, suffix or other sound description between slashes (/). For example, the phonemes represented by /n/ and /m/ in initial and final positions, respectively, appear in the words "name", "nighttime", "numb", and possibly several other words from a children's dictionary. If a user wishes to find one of these words in a software dictionary, and specifies the phonemes /n/ and /m/, the Phonic Engine presents the user with these three options. In a software encyclopedia, the phonemes /long a/ and /n/ would specify a group of entries including, for example, "Abraham Lincoln".

In an exemplary embodiment of the Phonic Engine, means are provided for (1) initially selecting the phonemes; (2) creating and displaying a list of words containing the phonemes in initial and final positions; and (3) selecting the desired entry. For a pre-literate or non-literate person, visual and/or auditory cues may be provided. It is contemplated that other orthographic information, such as prefixes and/or suffixes may be provided in the initial selection process. As used in this application "orthographic information" includes information that is more complex than just initial letters. It comprises, but is not limited to prefixes, suffixes, blends and root words. The exemplary Phonic Engine includes input means. The method of inputting selections depends on the individual hardware configuration of the user's system. One of ordinary skill in the art of software development could readily program a computer or workstation to receive user inputs from a keyboard or from a menu using a pointing device. Depending on the hardware configuration of the computer, inputs may optionally be received by alternative means, such as across a network, from scanning a document, from voice, interactive television, or from a remote control device.

It is contemplated that the Phonic Engine may be incorporated into other types of software programs, or dedicated devices. For example, the Phonic Engine may be incorporated within a software program for accessing data in a reference document, a dictionary, an encyclopedia, an almanac, etc. When the information is stored as data in a database, entries of interest may be retrieved by the Phonic Engine using language as the search criteria, even though the user does not know how to read or write.

In addition, it is contemplated that the Phonic Engine may be used to implement control functions, for example, to access an electronic program guide database in a television system in order to select a program for viewing.

If the Phonic Engine is incorporated into a writing program or word processor, it assists a non-literate person in writing a story. If the Phonic Engine is used in conjunction with a mechanical sorting device, it can form the basis of a word game or other game.

DETAILED DESCRIPTION

The first exemplary embodiment of the Phonic Engine is implemented as software in a reference work, specifically, a Talking Dictionary, a multimedia dictionary for children. The exemplary Talking Dictionary may be executed on a computer configured for multimedia presentation, such as a Macintosh computer including a display, pointing device, CD-ROM drive, sound generation, and text to speech conversion capability. Other hardware configurations may also be used.

TALKING DICTIONARY

The Talking Dictionary contains word entries. Each entry is associated with some or all of the members (attributes) listed in Table 1. It is contemplated that other attributes, such as (but not limited to) shape, color, size may also be incorporated into the entries.

TABLE 1

| | |
|---|---|
| (1) | the spelled word (optional) |
| (2) | phonetic/phonemic representation of the word |
| (3) | definition |
| (4) | usage example |
| (5) | sound effect |
| (6) | pronunciation |
| (7) | picture (may include the spelled word in the picture) |
| (8) | animation (optional) |

The Talking Dictionary offers a variety of activities and ways to look up a desired word; these methods are listed in Table 2.

TABLE 2

| | |
|---|---|
| (1) | by identifying initial/final sound |
| (2) | by spelling |
| (3) | by identifying attribute (such as shape, color and size) |
| (4) | by selecting the beginning letter and then perusing a list of alternative selections; |

TABLE 2-continued

| (5) | the user may try to sound out randomly generated or selected sets of words - verified by the computer; |
|---|---|
| (6) | the user may find the initial/final sounds (and other phonological units) of randomly generated or selected sets of words - verified by the computer; |
| (7) | matching picture or animation to a word; |
| (8) | Write Story; or |
| (9) | Read Story. |

Of the methods listed in Table 2, method (1) for finding a word by initial and final sounds is described in detail, below, with reference to FIGS. 1–3. Method (1) may be incorporated into a method for writing a story, which may be implemented as a separate application. The methods for writing and reading a story are also described below.

FIG. 1 shows the video display 10 of a computer executing an exemplary Talking Dictionary program in accordance with the invention. The Talking Dictionary shown in FIG. 1 includes six specified fields within display 10. Each field 11–16 is first described with reference to FIG. 1. The program flow is then described below with reference to FIG. 3.

Referring to FIG. 1, the first field is an alphabetic strip menu 11. Alphabetic strip menu 11 is used to select letters. Letters are selected using a pointing device (e.g., by pointing the cursor 18 of a mouse at one of the letters in alphabetic strip menu 11 and clicking the mouse). When a letter is selected, the initial allographs 12a–12c associated with that letter are displayed in an allograph area 12. The allograph is displayed as part of a word with corresponding picture or animation. The user selects the desired initial allograph (e.g., 12a in FIG. 1) by dragging and dropping the allograph 12a into the initial sound box 14. The user selects the desired final allograph by selecting a letter associated with the final allograph from alphabetic strip menu 11, selecting a desired allograph from a displayed list of allographs corresponding to the selected letter, dragging the desired allograph from allograph area 12 and dropping the allograph into the final sound box 16.

A list 17 of words 17a–17g within the Talking Dictionary database that start with the initial sound of the word in the initial sound box 14 and end with the final sound of the word in the final sound box 16 are displayed within a display area 13. One of the words 17a–17g is selected by dragging and dropping the word into the word entry box 15. Alternately, the initial and final allographs and the target word may be selected by simply pointing to the corresponding picture and indicating a selection, for example by "clicking" a button on the mouse. The program can determine, from the context of the selection process, whether the selected allograph is an initial sound or a final sound and whether the selected word is the target word.

OPERATION

The execution flow of the Talking Dictionary program is now described with reference to FIG. 3. At step 20, when the "Initial/Final Sounds look-up activity" program is executed, alphabetic strip menu 11, allograph area 12, initial sound box 14, final sound box 16, word entry box 15 and a display area 13 may be displayed. A voice provides spoken instructions on use of this activity.

Alphabetic strip menu 11 appears across the top of the screen. The strip menu 11 contains the alphabet, and provides a means for indicating phonemes. The user is then prompted (for example, by a spoken message) to select an initial sound. This is accomplished by selecting a letter.

In one exemplary system, a user may be assisted in selecting a letter from the alphabetic strip menu by software which pronounces the names of the letters as the selection pointer is dragged across the alphabetic strip. In this instance, pointing at a letter without clicking is interpreted as indicating a possible selection.

At step 30 a first letter is selected. Users approximately kindergarten age or older typically are sufficiently familiar with the alphabet to select a letter appropriate for the desired sound much of the time. The exemplary embodiment also assists users that do not have sufficient knowledge of the alphabet to identify the first letter. Pre-kindergarten children may also explore with the talking dictionary, receiving reinforcing animations and language knowledge while simply playing. When any letter is selected, the allographs that appear in the initial position of words in the dictionary and begin with that letter are displayed underneath strip menu 11, in allograph area 12. For example, when the letter "c" is selected, the allographs 12a–12c representing /hard c/ (carrot), /soft c/ (city) and /ch/ (child) are displayed in allograph area 12. Both the word and an associated picture or animation may be displayed, with the initial allograph highlighted, as shown in FIG. 1.

The more engaging the picture or animation, the better. If a child hears a pig snort and say "oink" when he or she clicks on "oi", that allograph is more likely to be remembered. If a child hears an amusing argument between the two pronunciations of "either", he or she is more likely to remember that "ei" can represent either /long e/ or /long i/. Rules of orthography may also be presented (such as i before e, etc.)

Referring again to step 30 of FIG. 3, once the allographs 12a–12c are displayed in allograph area 12, the user may be prompted by a spoken message to select one of the allographs. The user selects an allograph 12a by, for example, pointing the cursor 18 of a mouse (not shown) on the allograph. When an allograph 12a is selected, a voice pronounces the allograph, along with any necessary explanatory information.

When the letter c is selected, as shown in FIG. 1, pictures of a carrot, city and child are shown, along with associated allographs c, c, and ch (perhaps others) and words. If the carrot is selected, as shown in FIG. 1, a voice may say, "This is the letter c. It can make the sound /k/ as in carrot." If allograph 12b for city is selected, a voice may state, "This is the letter c. It can make the sound /s/ as in city." If allograph 12c is selected, a voice may state, "The letters ch together can make the sound /ch/ as in child."

At this point, a user that is unfamiliar with the alphabet may realize that none of the allographs displayed for the letter "c" represents the desired phoneme. The user then selects a different letter from alphabet strip menu 11, and continues to select allographs until the user finds a letter and allograph that correspond to the first sound of the desired word. When the user finds an allograph corresponding to the desired initial sound of the word, he or she drags the allograph and drops it in the initial sound box 14. The Talking Dictionary displays a representation of that allograph in the initial sound entry box and stores the phoneme associated with that allograph in a temporary variable.

It is emphasized that the phoneme itself is actually selected by the exemplary selection method, not the allograph. For example, selection of the allograph k in initial position, along with t in the final position would represent carrot and cat, just as c would. And choosing the hard c in carrot (along with final sound /s/), would bring up class and kiss during a search of the database, but not circus.

In this way, grapheme/phoneme correspondence is presented, but not forced, because any allographs representing the same initial/final sounds produce the same results. Thus, the child is gently exposed to grapheme/phoneme associations, and encouraged to use this information for reinforcing material, but is not punished for a spelling error.

Referring again to FIG. 3, at step 40, a nearly identical (to step 30) procedure is followed for selecting the final sound. A letter is selected from alphabetic strip menu 11. Final allographs with corresponding pictures and words which are associated with the selected letter are displayed in allograph area 12. As shown in FIG. 1, selecting the letter "p" indicate the final allograph may, for example, result in a picture of a ship (which ends with the phoneme /p/). The final allograph and its associated information are selected, dragged and dropped into the final sound entry box 16. A representation of the final phoneme associated with that allograph is then stored in a temporary variable.

At step 50, once initial and final sound selections are complete, a search loop may be entered to find all matching entries in the dictionary database. The initial and final phonemes are matched against the entries in the dictionary. Each entry in the database contains a phonetically (or phonemically) coded representation, and the indicated initial and final phonemes are compared against the initial and final phonemes of each entry.

Table 3 lists pseudocode that may be used to perform a search of entries having the desired initial and final sounds.

TABLE 3

| 100 | for all dictionary entries |
| --- | --- |
| 110 | compare initial phoneme |
| 120 | if match |
| 130 | compare final phoneme |
| 140 | if match |
| 150 | save in buffer (save word, pronunciation, special information, and pointer to entry/record locator information) |
| 160 | else |
| 170 | move on to next |
| 180 | else |
| 190 | move on to next |

Reference is again made to FIG. 3. If, at step 60, no word is found by the search, then at step 70, a spoken voice message tells the user that no words were found by the search. Control passes to step 30, and the user is prompted to select a new initial sound.

At step 60, if any words are found by the search, this procedure produces a list of matched entries, which is then presented to the user to peruse at step 80.

At step 80, the list 17 of matched entries 17a–17g is presented to the user. For example, if the initial and final phonemes /k/ and /p/ are selected in steps 30 and 40, then at step 80, the list 17 may appear as shown in FIG. 1. Because the phoneme /k/ is selected, the list 17 may include words that begin with the phoneme /k/, regardless of spelling; in the exemplary display of FIG. 1, words that begin with the letters "c" and "k" are displayed. The list 17 may be presented as a list of printed words, as shown in FIG. 1, as a set of pictures, representing the words, or as a combination of printed words and pictures.

If there are many entries (e.g., if the initial sound is /s/, which contains many blends), a secondary indicator sound may optionally be used to narrow down the list. For example, the user may be asked to identify a third sound that appears in the word between the initial sound and the final sound.

Referring again to step 80 of FIG. 3, once the list 17 of words is displayed, the words are highlighted and pronounced in succession. Optionally, the voice message may also include special information about words: homonyms, double pronunciations, etc. At any time, the user may select a word 17a–17g, using the pointing device, or by pressing the "enter" button while a word is highlighted. When a word is selected, it may be verified by voice, saying for example: "The word you selected is '<word>'. Is this the word you want?"

If the user indicates "yes", by activating a control button on the screen (not shown) then, at step 90, the word is displayed in the word entry box 15 and an animation may be displayed in the display area 13.

Alternatively, once a user has initiated a search for items matching the initial and other sound, a matrix containing pictures and/or words will be displayed. This matrix may use several pages depending on the number of matching entries that are found. When the user rolls the mouse pointer over a picture or word, indicating the item as a possible selection, if there is a word associated with the item it will be pronounced. When the user selects a picture or word, the display area may show a definition or other material about the word. In addition, a filmstrip icon may be displayed allowing the user to view a short animation about the word. In addition, the program may pronounce the selected word. In this implementation, the information is not provided in a fixed sequence but the user is allowed to focus only on information of interest using, for example, a "point and click" selection technique. Synchronization between animation and sound will occur as an artifact of using Video for Windows®, or Quicktime video either for Windows® or for Macintosh®.

Once an entry is located, it is displayed as a combination of the attributes listed in Table 1, according to sequencing information found in the associated database record. The user may repeat the display by clicking on the selected word.

At step 90 of FIG. 3, an entry may be presented by the Talking Dictionary in a variety of ways as explained in the following paragraphs.

Figure 2:
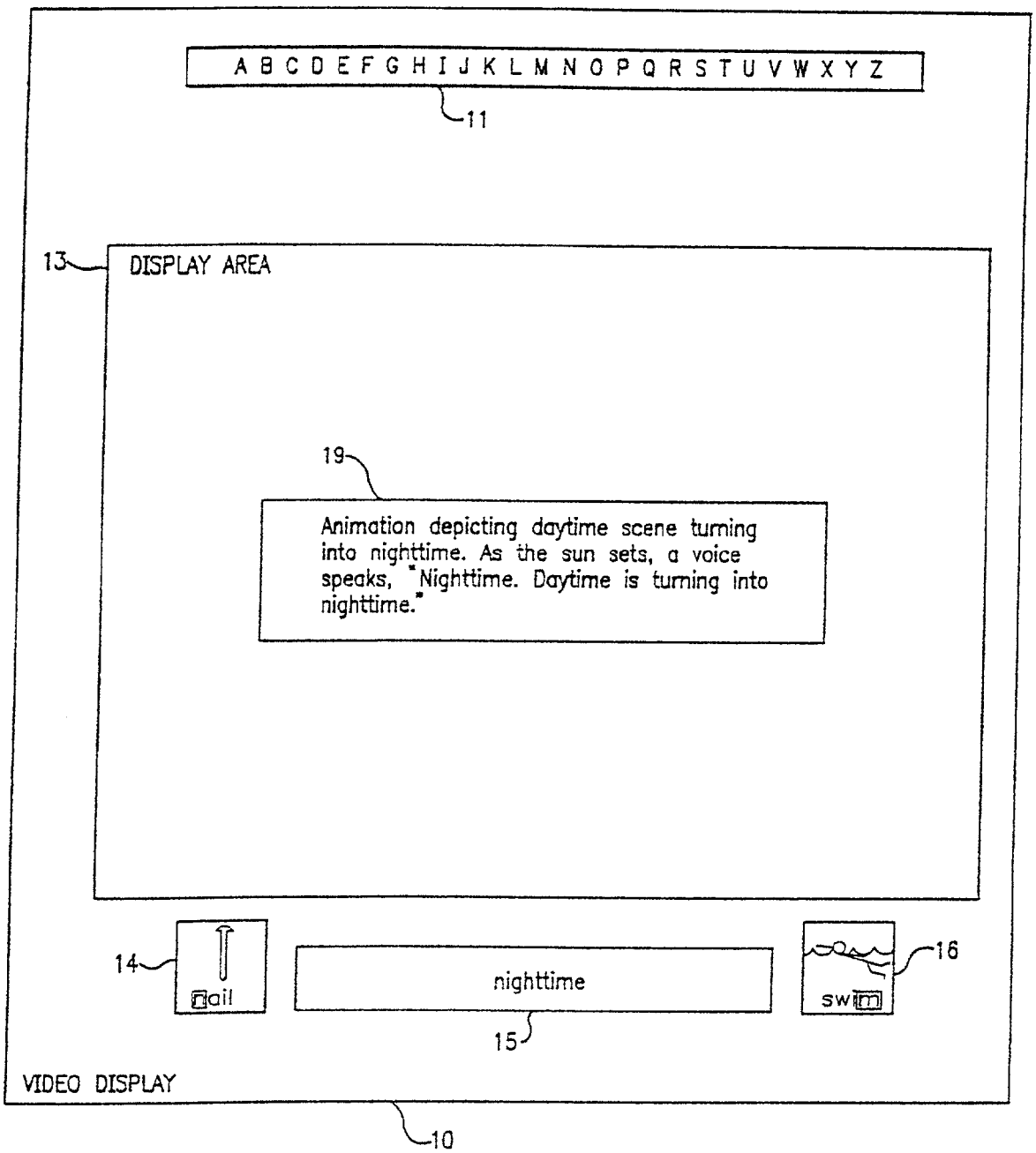
FIG. 2 shows the video display of FIG. 1, displaying animation in the display area.

For example, as shown in FIG. 2, selecting the phonemes /n/ and /m/ as initial and final sounds may result in list 17 including the word "nighttime". If "nighttime" is selected, an animation 19 depicting a daytime scene turning into nighttime may be displayed in display area 13. In another example (not shown), if the word "tall" is displayed, a picture or an animation of a skyscraper may appear in a display area 13.

An exemplary animation for the word "tall" (not shown) may include the following: A boy and his mother are standing in front of a skyscraper. The boy looks up at the skyscraper and exclaims, "Wow, mom, that's a tall skyscraper!" On top of the skyscraper is King Kong. He jumps off, screaming "yippee i o ky ay!" Then King Kong's parachute opens, and he smiles and winks. The boy and his mom giggle. Beneath the animation, the words "Wow, mom, that's a tall skyscraper!" are displayed. Each word or group of words is highlighted as the boy utters the word. The word "tall" is emphasized. For example, "tall" may be displayed in a different color, reverse video or italicized. The user may select any of the words in the sentence using a pointing device or keyboard. As each word is selected, it is pronounced. When the word "tall" is selected, the animation is repeated. The optional animation may be especially effective for conveying and reinforcing concepts or abstract ideas such as "near" and "far" or "freedom".

It will be understood by one of ordinary skill that instead of animation, a still picture of the skyscraper may be displayed in display area 13, and the sentence, "Wow, mom, that's a tall skyscraper!" may be displayed beneath the picture. Again, each word is highlighted as it is uttered by a voice. The user then has the same option of selecting any of the words displayed.

It will be understood by one of ordinary skill in the art of designing educational tools that some onomatopoeic words (or other words) may be reinforced by the production of sounds at step 90, without animation or pictures. The Talking Dictionary allows each word to be reinforced by the respective medium/media that best suit(s) that word.

OTHER VARIATIONS

Many variations of the exemplary method and system are contemplated. For example, if the letter e is chosen at steps 30 or 40 of FIG. 3, several pictures may be shown. The initial allographs associated with the letter "e" are displayed, along with associated pictures. A question mark and a package tied with a bow may also be shown. Below the question mark is the allograph "ei" and the word "either". When the question mark is selected, a voice responds, "The letters 'ei' can make the sound /long e/ as in either. An animation demonstrating the concept of "either" is shown. When the package is selected, a voice responds "When you use the letters 'ei' or 'ie', think of this: i before e except after c, or when sounding like /long a/ as in neighbor or weigh." An animation is shown to illustrate the point.

Optionally, when the question mark is selected, the voice may indicate that "ei" can be pronounced /long i/ as in "either."

A variation is contemplated wherein the matched list is presented with graphic indicators (pictures, animations, etc.) instead of, or in addition to, the pronunciation.

Another variation is contemplated wherein the Phonic Engine is coupled with an encyclopedia or other work. In this case, the text heading of each entry would be searched on, which may include more than one word. Also, the entry may be presented using a combination of one or more media elements, including pictures, movies, text, animation, or sound to depict an event, biography, place, thing, or other entry.

A variation is contemplated wherein the allographs are displayed with associated animations instead of pictures. These may be random associated animations drawn from the Talking Dictionary's database.

Figure 3:
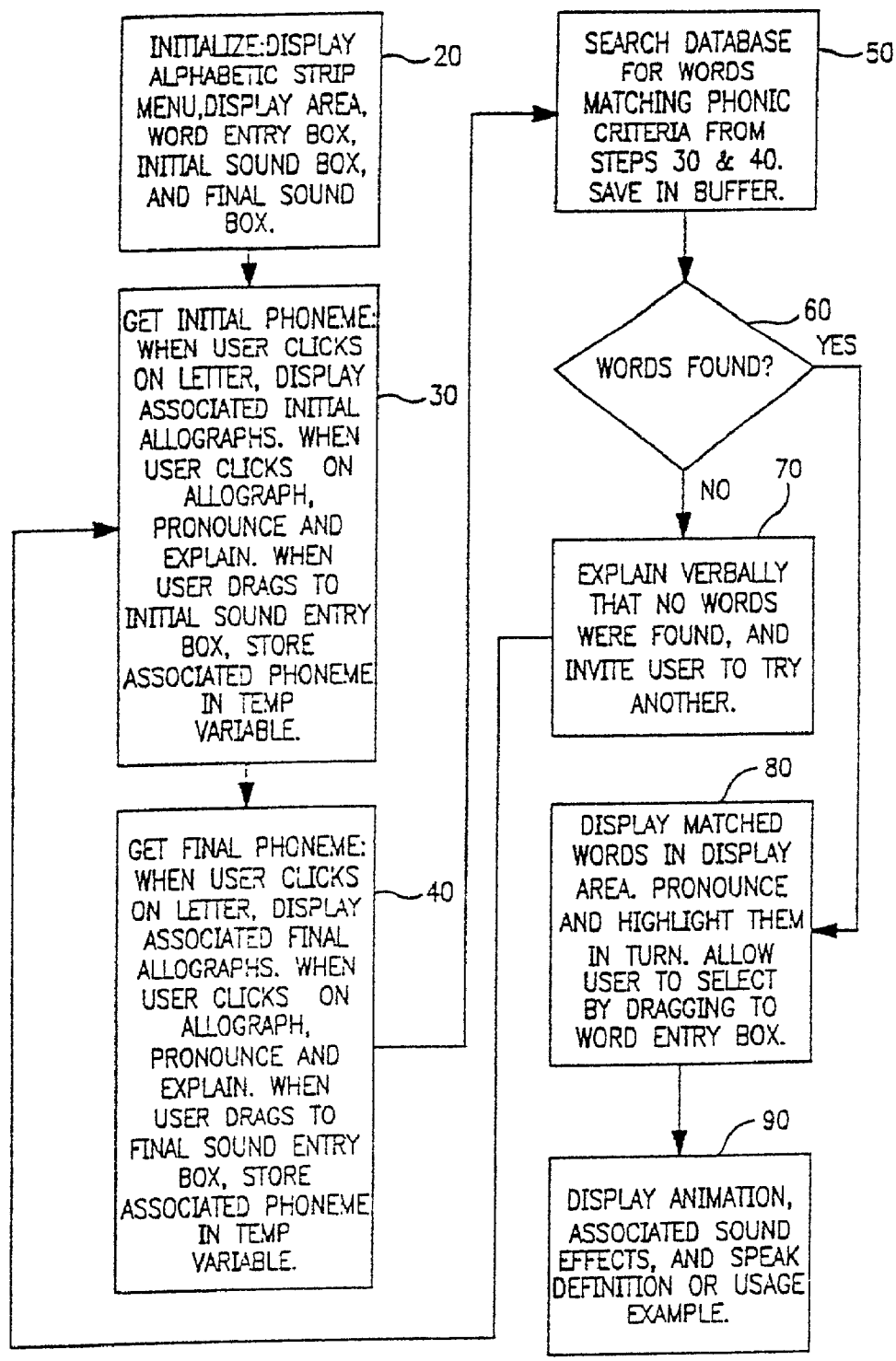
FIG. 3 is a flow chart diagram showing an exemplary method according to the invention.

Initial/final sound selection may also be accomplished via a number of alternative methods which may be used instead of, or in conjunction with, the method shown in FIG. 3. One alternative is the use of a simplified phonetic/phonemic alphabet. Whereas the method discussed above with reference to FIG. 3 allows selection of phoneme via grapheme, the alternative method would allow selection of phoneme directly. Optionally, this method may also provide secondarily an association with the corresponding grapheme. Of course, the allographs presented in the selected process need not include all of the allographs in the grapheme but may include a subset, for example, only those allographs that are likely to be familiar to a particular class of user or only those allographs which occur in the particular selection database that is being used.

Using the method of direct sound selection, the strip menu 11 would contain a representation for /a/ /b/ /k/ etc., as well as /au/ /aw/ and others. As an example of usage: if a user wishes to look up the word "back", he or she indicates /b/ as the initial sound, and /k/ as the final sound. When /b/ is selected, a picture of a boy appears along with the letter "b". Then, a voice may say, "This is the sound /b/. It is made with the letter 'b'." If /k/ is selected, pictures of a kite and a carrot may appear, with the letters k and c, respectively. A voice may then say: "This is the sound /k/. It can be made with the letters 'k' or 'c'."

Although the exemplary embodiment includes the use of an initial sound and a final sound, other embodiments are contemplated in which (1) initial and median sounds are used; and (2) initial, median and final sounds are used. In another alternative variation, it is contemplated that various phonetic/phonemic combinations and/or orthographic combinations may be used, based on or tailored to the knowledge of the user. One may, for instance, incorporate prefixes or suffixes as selection criteria for a suitable audience.

If there is some phonetic/phonemic or orthographic knowledge which could be used as discrimination criteria by an individual who has a particular handicap, that information may be incorporated to be used for leverage for that individual.

For example, to suit a group of users who have difficulty discriminating initial sound (or for other reasons), final and other, median and other, or final letter and median sound, etc. may be used. To suit a group of users who have difficulty in sound discrimination (or for other reasons), sounds and orthographic information may be remapped in any fashion, to enable those users to use language via this method.

It is understood by one of ordinary skill in the art of computer programming that a variation of the exemplary method may be constructed, in which the user is given a choice between entering a median sound or a final sound. The user may then use whichever combination of first sound and other (i.e., median or final) sound that provides a shorter list 17 from which to select the desired word. It is also understood by one of ordinary skill in the art of computer programming that if list 17 is long, it may be presented in columns and rows or in any other suitable arrangement.

In another alternative variation, instead of having entries coded phonetically, a rule based algorithm may also be used for the search.

In a further alternative variation, a concordance structure representing all combinations of initial and final phonemes may be used. If a concordance is used, each entry in this structure has pointers to (or indices of) words containing a respective combination of initial/final phonemes in the dictionary database. The search would then consist of locating the particular phoneme pair under consideration in this secondary structure; retrieving index information; and then using this information to retrieve the desired entry information from the dictionary database or another concordance.

It will be understood by one having ordinary skill in the art of computer programming that the choice of grapheme/phoneme correspondence, or phoneme/grapheme correspondence may be implemented as an option within the software. The two methods could be used together, for instance augmenting a grapheme/phoneme selection list with a phoneme/grapheme list for vowels only.

Alternatively, three options (phoneme list, phoneme/grapheme list and grapheme/phoneme list) may be provided, each option directed to users of a respectively different stage in language development. A phoneme list may be used first by users who have no experience with the alphabet. At a later stage of language development, a phoneme/grapheme list is used. Eventually, the user's language skills become sufficiently advanced to use a grapheme/phoneme list.

It will be understood by one of ordinary skill in the art of programming educational software that the initial/final sound method of FIG. 3 may be expanded into a method for writing a story, hereafter "Write Story". This variation allows a user to create an animated story, even if the user is not able to read or write. A writing area (not shown) is displayed in which a story may be composed. The user may use one of the word look-up methods listed above in Table 2 to look up words that are added (one at a time) to the story. Additionally, a mechanism is provided whereby the user can write, using his or her own invented spellings. If the user wishes to have an animation associated with the word, he or she may then have the word checked. If the word is not recognized, the user is coached to verify the initial and final sounds, and this is used, in conjunction with other means, to help ascertain the word the user is trying to write.

If the database does not include the right word (e.g., if the user misspells a word), the system may include a method for displaying an animation for the misspelled word. The user may also select his or her own invented spellings along with animations.

Once the story is complete, it is displayed and/or read back to the user. The user is then given the opportunity to select individual words; selecting one of the words initiates display of the associated animations and sounds.

The method hereafter referred to as "Read Story" provides a means to have any written text spoken and displayed as an animated story. It also provides a means for whole language instruction.

When the Read Story feature is selected, the user has an opportunity to select a document. The document may be a letter, story, or other document written by the user, a parent, friend, or teacher, or a well known piece of children's (or other) literature. The selected story is read aloud, and the individual words are highlighted as they are read. When a user selects a word, a corresponding animation is presented, from the internal database.

Because all or most of the words in the database have associated pictures, animations, pronunciations, and/or sounds, this associated information may be used to present a wealth of activities based on:

(1) picture/word correspondence;
(2) word/sound correspondence;
(3) word/letter correspondence;
(4) letter/sound correspondence, etc.

Amusing activities may also be included, such as mixing up definitions and pictures, and letting children detect and correct the errors.

CREATING THE DATABASE

The number of words in the database (dictionary) is selected to be suitable for users in a desired age range or other desired criteria. The maximum number of words that is displayed in list 17 (shown in FIG. 1) is related to the number of words in the database and the distribution of initial and final sounds for the entry headings in the database. In an extensive database, or a database that, for some reason, has many entries for a single initial/final phoneme pair, it is theoretically possible to overfill the display area (Once the database is complete, the maximum display area needed to display text headings for each initial/final sound pair can be determined). In that case, a mechanism should be provided for scrolling, paging, etc. Alternatively, the size of the dictionary and/or the distribution of initial and final sounds of the words in the dictionary may be adjusted to eliminate the chance of overfilling the display.

For each word, a data record is created containing the following:
1. the correctly spelled word (text) (optional)
2. phonetic/phonemic coding of the word (text) or numeric data
3. definition (text)
4. definition (digitized sound; if text to speech, the text definition may be used instead)
5. pronunciation (digitized sound; if using text to speech, the correctly spelled word may be used instead.)
6. sound effect (digitized sound)
7. picture
8. animation or still picture (may include word text as part of graphic)
9. usage example (text, if using text to speech; or digitized sound)
10. special information (exception information); codes representing various conditions, such as homonyms
11. sequence information These records are grouped into a database. The database may be a table, arranged in alphabetical order by word, and stored on a sufficiently large medium. Because the entries are accessed by initial and final sound, it may be desirable to create a secondary table of all the possible initial/final sound combinations, to increase speed. Preferably the table has pointers to the associated digitized graphic and sound entries. The table is stored in a medium that may be accessed rapidly by the processor.

The animation may be stored as a PICS file or series of PICT files on a Macintosh computer manufactured by the Apple Corporation. The picture may be stored as a PICT file on a Macintosh. Digitized sound may be stored as an AIFF file on a Macintosh. An authoring tool, such as Macromedia Director sold by Macromedia Corporation of San Francisco, Calif., may be used for creating parts of the Talking Dictionary.

The Talking Dictionary may be stored on CD-ROM or interactive television. In this case, it may be preferable to utilize pointers to animations and sounds, and to store them separately from the data records. This allows the data record to be cached in memory, or on the hard disk, providing more efficient access.

The special information fields may contain any special information that may inform the user of special attributes of the word. Examples of special information include (but are not limited to), whether a particular word/spelling may have two pronunciations; synonyms, antonyms, homonyms, etc.

Sequence information is the order in which the word information is displayed. Some entries may have all fields present; others may not. The visual animation may be displayed with the definition, the usage example, the sound effect, or other associated information. For example, with reference to the numbered attributes in Table 1, sequence information 6, 3, 4/8 may indicate that the computer first pronounces the word; then states the definition; then displays the animation along with a usage example.

For the phonetic/phonemic coding of the word, the international phonetic alphabet may be used. Other systems may alternatively be selected, such as are often found as front matter in printed dictionaries.

With respect to the multimedia elements, design trade offs are involved between space, quality and the number of entries. Options include: storing sound and animation in compressed format, and using on-the-fly decompression for presentation of these elements. In a Macintosh environment, PackBits and UnpackBits OS calls may be used for this purpose (these work best with pictorial information). Well known algorithms for lossless or lossy compression, for example LZW (Lempel-Ziv & Welsh), may be used. Suitable compression programs are available for the Macintosh from Aladdin Software, 165 Westridge Drive, Watsonville, Calif.

If necessary, space may be saved by: (1) providing animations in black and white instead of color; (2) using a smaller bit depth; (3) using digitized speech at a low sampling rate; (4) using text-to-speech technology instead of, or in addition to, digitized speech. Other techniques known to those of ordinary skill in the field of programming applications having graphics and sound may also be used.

Many alternative embodiments are contemplated. For example, the Phonic Engine may also be included in other reference works, in a writing program, as a command interpreter, or any other situation where a person who does not know how to read or write wishes to understand or denote written language.

Some databases may have initial/final sound combinations (e.g., words beginning with "s") for which a large number of entries are present. One of ordinary skill in the art of programming would readily understand how to add logic to obtain a secondary indicator. For example, the system may request that a user narrow down an initial "s" to include or eliminate a word beginning with an s blend. Alternatively, the system may ask for any median sound in the word.

The inventor is currently developing a prototype Talking Dictionary. This prototype deals with a specific subset of words: words depicting animals. For purposes of this discussion, this shall be referred to as the "Prototype." There are approximately 200 animals in this Prototype.

The exemplary Prototype is implemented using Microsoft Visual Basic, Professional Edition, Version 3.0 for Windows. The target environment for the prototype includes: Windows 3.1; CD-ROM (or other high capacity random access storage device); sound board; and speakers. For performance or other purposes, DLLs written in C or another compiled programming language may be utilized to accomplish certain tasks. Also, Windows API calls may be declared and used if necessary to enhance performance or achieve other objectives. As an alternative to Visual Basic, another programming environment such as C or C++ may be used.

With reference to FIG. 1, the menu bar may be implemented using a command button array; the allographs 12a–12c may utilize an image control array; the initial sound box and final sound box may also be image controls; and the word box may be a picture control. It will be understood by one of ordinary skill in programming systems using GUI's, that alternate control types or custom controls may be used. Controls for displaying words may depend on whether the words are displayed as text or bitmapped graphics.

For presentation of sound (.WAV files) within the program, the sndPlaySound API function is used. Animations are displayed using Microsoft Video for Windows, compressed with the Microsoft RLE Codec. The MCIWNDX control, from the Microsoft Video for Windows development kit, is used for presenting the animations. The animations may be rendered using Autodesk Animator Pro, along with other graphic tools.

A picture clip control may be useful in speeding up graphic presentation of the allographs and associated pictures.

When the user initiates the Prototype, he or she views the menu bar, the initial and final allograph boxes; and the word box. When the user rolls the mouse over a letter, the letter is pronounced. When the user clicks on a letter (using a pointing device) or otherwise selects a letter, the associated allographs are displayed. The user preselects whether initial or final allographs are displayed by first clicking on the initial or final allograph box. When either of these is clicked, all allographs are cleared from the screen, and the user is presented with allographs of the type selected.

When the user rolls the mouse over a displayed allograph, information about the allograph is spoken, such as "This is the letter b. It makes the sound /b/ as in balloon." If the user then clicks on this allograph, the allograph display (in this case a picture of a balloon, and the word balloon) are displayed in the initial allograph box. Final allograph is selected in the same manner. If the user changes his or her mind, he or she may replace the selected initial or final allograph by clicking on the appropriate allograph box, then selecting the desired allograph for the desired initial or final sound.

After the user has selected initial and final allographs, he or she may initiate a search for words matching the sounds associated with these allographs by clicking on the Word Entry Box. One of ordinary skill in the art of programming would understand that one may use a separate or other indicator for this, such as a command button of a particular color, or with a symbol or word on it, or a key on the keyboard.

Figure 5:
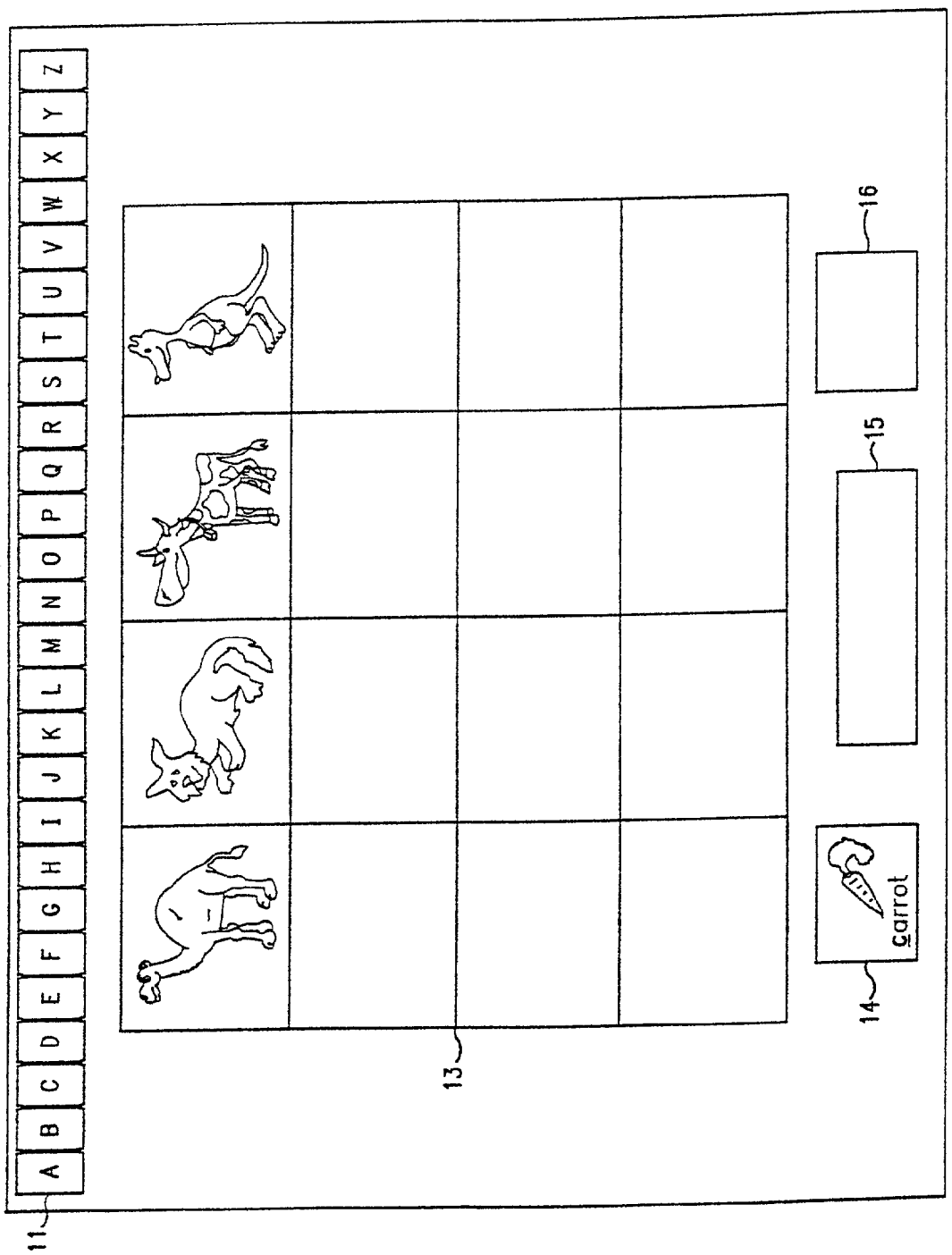
FIG. 5 is a diagram of an alternate computer video display executing a process according to the present invention within a software program.

When the search for matching words is complete, a matrix or list of selections is presented within display area 13, as shown in FIG. 5. In the exemplary Prototype, each selection in the matrix has a small picture of an animal associated with it, and the name of the animal displayed adjacent to the picture. When the user rolls the mouse over a selection, the name of the animal is spoken. When the user clicks on the selection, a display is shown within display area 13 containing: 1. A definition (description) of the animal, 2. An interesting fact about the animal, and 3. The same picture of the animal. The definition and interesting fact will each have an icon next to it which, if clicked on, will cause a .WAV file to be played speaking the displayed words. If the animal itself is clicked on, or an icon adjacent to the animal, such as a filmstrip icon for example, a MCIWNDX control will appear with the first frame of the associated animation. The user may then start the animation, and manipulate it, using a slider to go slower, faster, and backwards. The user may view the animation as many times as he or she wishes.

One of ordinary skill in the art of programming would understand that if only one choice is matched with the initial/final phonemes, the list or matrix need not necessarily be displayed, but only the display of the selected choice.

When the user wishes to select another animal, he or she clicks on the initial or final sound input box. This causes the screen to appear in its initial configuration. One of ordinary skill in the art of programming would understand that there are numerous ways to return to the initial state, such as a command button, a keyboard key, and so forth.

FIG. 5 depicts an exemplary interface of the Phonic Engine after a matched list has been presented. In this figure, only an initial sound has been used. The figure depicts the display generated by the exemplary Prototype. With the sound /k/ having been chosen as the initial sound, pictures of a camel, cat, cow and kangaroo may be displayed, among others.

If this exemplary interface were to be adapted for use in conjunction with another type of system, for example, a "Pay Per View" interactive television (ITV) system, the movie name "Casper", a picture of its main character or a reduced size version of its print advertisement may be displayed among others. If the interface were used in an ITV, online services, kiosk or other scenario where a child may have access to motion videos showing the history, mechanics, science and other information about certain inventions, pictures of a camera and a cuckoo clock, among others, may be displayed.

One of ordinary skill in the art of multimedia programming would understand that the animation may be presented adjacent to the definition and interesting fact, or as a larger animation, temporarily obscuring other information on the screen. In the latter case, one of ordinary skill in the art of programming would understand that means for reviewing the written material could be accomplished via clicking the word box, a command button, the original selection with picture of the animal, minimized and placed appropriately on the screen, or another indicator appropriately placed on the screen or by a keyboard key.

In the exemplary Prototype, the searching process may be accomplished by processing an array of a user defined data type, where each array member may include information used to select the array member and information used to display the associated data, such as: indicators of initial and final (or just an initial) phonemes associated with the name of the animal, a filename of a small picture for the list or matrix and display, the name of a file containing associated animation data; the name of a file containing associated word, definition, interesting fact, etc. Members matching the initial and final (or just initial) phonemes are displayed in the above stated list or matrix. If the list or matrix overflows the allocated screen area, scrolling or paging will be used to display the remaining selections. One of ordinary skill in programming would understand that the array may be an array of a user defined type, or another set of properly organized data structures; and that such features as filenames, file formats, data organization, and data aggregation, for example, may be implemented in a variety of ways.

Another contemplated variation uses only the initial phoneme for selection. For a young audience, and for a database in which the number of items is sufficiently limited that a set of a readily browsable choices are likely to be displayed for any initial phoneme, this type of selection process may be useful.

In another variation, each entry in a collection of meanings has no associated text. Just sensory data about the meaning. For example, in the Talking Dictionary or Prototype systems, it is not necessary to have any text associated with an entry to locate it by orthographic or phonetic/phonemic component(s).

In another variation, the Phonic Engine is used in conjunction with a television receiver containing an electronic program guide (EPG) such as the StarSight® system, available on Zenith® television receivers, where users can utilize it as a navigational tool to select programs. In yet another variation, the Phonic Engine may be used in connection with interfaces to interactive television systems or online services. In these applications, one may use the Phonic Engine to select merchandise, or perform other transactions which would otherwise not be selectable to those with limited language capability. For example, if a child wants to view the program Sonic The Hedgehog®, or play the video game Sonic Spinball®; and if the number of programs and/or video games was very large, the user could input indicators for the phonemes /s/ and /k/, or /s/ and /g/ (for Sonic, and Sonic the Hedgehog, respectively), be shown a matrix of pictures of all corresponding items, of which the above would be a part; be able to browse the selection and (optionally) hear the names of the selections pronounced, and finally select the desired item. One of ordinary skill in the art of designing user interfaces would recognize that the phonetic/phonemic and other indicators could be on-screen, on a simple remote device, or on a remote device with display and selection capabilities.

In another variation, it would be apparent to one with ordinary skill in programming for networks, that this technology can easily be implemented across networks, via TV or interactive TV or, online services, for both navigation and selection of games, programs, merchandise or other materials or information; in kiosks at children's museums and other places where a child, or one with limited language capabilities, is trying to find information.

An on-screen user interface of this type may be substantially the same as that shown in FIG. 1 except that it shows small pictures adjacent to the words or may not show words at all. Alternatively, a display of the type described above, with reference to FIG. 5 may be used.

In another variation, it would be apparent to one of ordinary skill in the art of programming that the Phonic Engine could be incorporated into a computer or other command interpreter. For example, an interface similar to FIG. 1 would be displayed on a CRT screen, and a child or one with limited language could use the interface as in the exemplary Talking Dictionary. In this case one could display a list of commands corresponding to computer commands, and the commands would be sequentially pronounced, or pronounced when clicked on.

In another variation, blends and other orthographic information (e.g. prefixes or suffixes) may be used in conjunction with sensory elements (e.g. pictures or sounds) to lead to selection of a meaning. In this variation, the blends could be selected in the same fashion as allographs in FIG. 1, that is, by first selecting the letter with which the blend or other orthographic element begins.

The Phonic Engine may generally be applied as a software object to any type of selection process in an application where a user provides a list of selections and corresponding language-based data, such as initial and final phonemes, prefixes, suffixes or other language components. In this form, the Phonic Engine could be integrated with the application.

From a functional point of view, the visual interface presented by this object may be substantially the same as that shown in FIG. 1. The object, however, may allow a user to design an alternative interface by providing a set of entry points and event handlers that could be associated with controls or objects on a screen or other objects using well-known techniques. The interface may be adapted to provide only phonetic/phonemic or orthographic choices associated with the possible selections and to yield user input in terms of, for example, the index of a desired selection or the initial and final sounds of the desired selection. Under appropriate circumstances, it may be desirable for the object to accept only initial sounds or to accept language components other than initial and final sounds, such as medial sounds, prefixes or suffixes.

The input data may be used by the object as search criteria for a list of selections provided by the application programmer. The resulting matches may be provided for the user to browse, either visually, using pictures provided by the programmer; aurally, using 1) sound-clips provided by the programmer, or 2) an internal text-to-speech translator to say text provided by the programmer.

The visual interface presented by this object may be substantially the same as shown in FIG. 1. The object may also allow a user to design an alternative interface through a number of means, such as varying the size, design or selection method of the controls; or by varying the type of information (phonetic/phonemic, orthographic, etc.) provided to suit the audience and/or the associated possible selections.

Integration may occur to different degrees. For example, the Phonic Engine could obtain the user input only, and pass it to a routine supplied by an application developer; or could be aware of the database and selection criteria, search the database, and provide indexes or pointers of matched entries to a routine which would manage further selections/transactions; or it could be made aware of the nature of the media within the database, receive further selection from the list of matches, and pass this to a supplied routine for further processing; and so on.

MECHANICAL EMBODIMENT

As mentioned above, mechanical devices may also be used to practice the invention. An exemplary alternative mechanical embodiment may include a selectively punched card for each respective word in the dictionary or database. U.S. Pat. No. 2,556,232 to Stiller, U.S. Pat. No. 2,647,519 to R. Brinkmann to Broxten and U.S. Pat. No. 4,081,079 to Roth et al. are hereby expressly incorporated by reference for their teachings on the construction and use of mechanical selection devices for card indexes.

The exemplary mechanical embodiment includes a device and technique such as that described in U.S. Pat. No. 2,647,519 to R. Brinkmann. Familiarity with that patent is assumed, and a detailed description of the complete Brinkmann device is not repeated herein. In Brinkmann, a first selector card is placed in the front of a stack of index cards, and an identical selector card is placed in the back of the stack. Cards are selected by placing a selector rod through a hole in the front selector card, through the stack, and out through the rear selector card. The cards in the stack are allowed to drop, except for the cards having circular holes that line up with the holes in the selector cards through which the selector rod has been inserted.

Figure 4A:
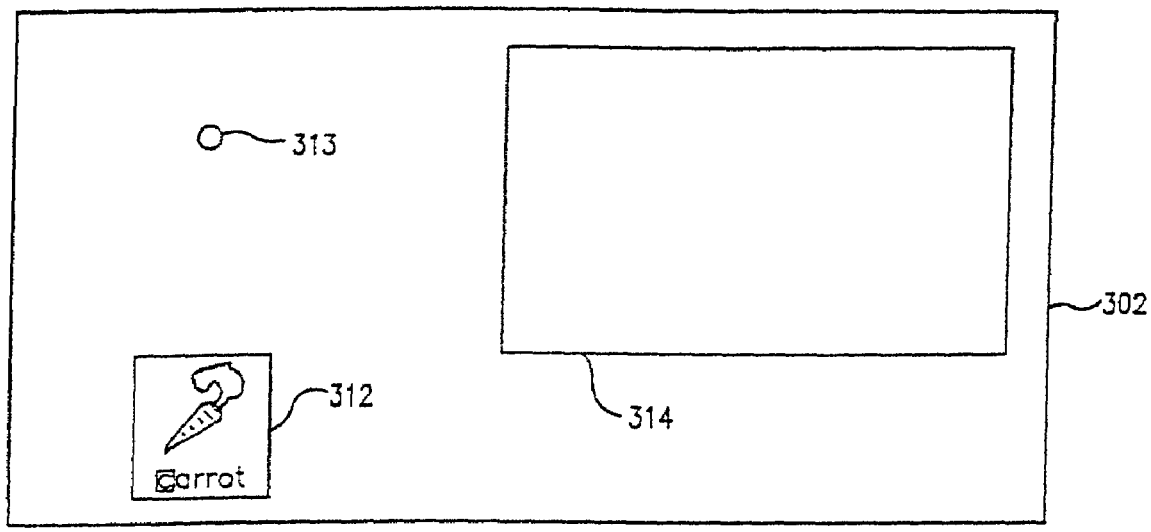
FIGS. 4A and 4B show selector cards that are used in a further exemplary embodiment of the invention.
Figure 4B:
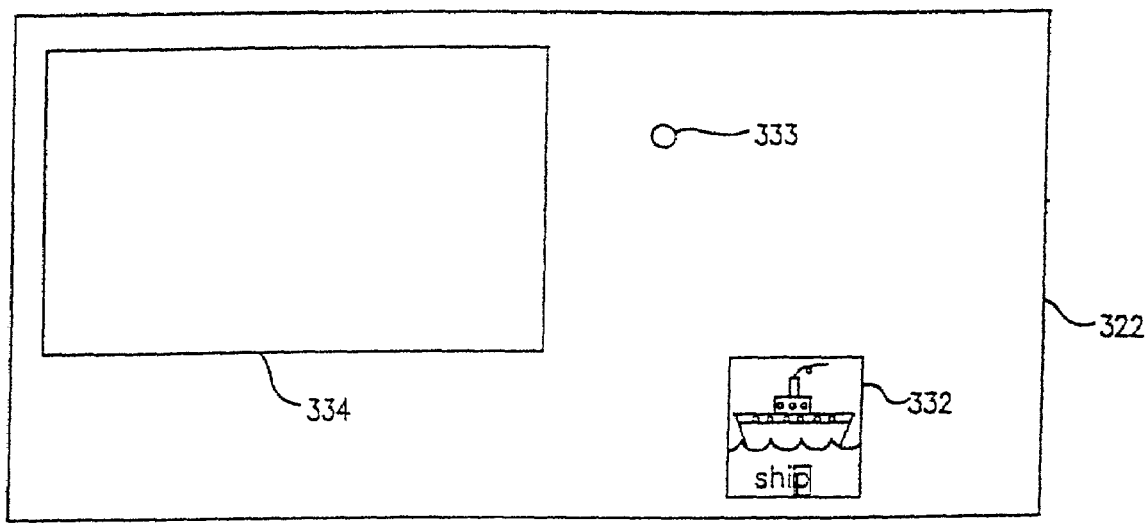

Reference is now made to FIGS. 4A and 4B. In the exemplary mechanical embodiment of this invention, a plurality of word cards (not shown) are stacked horizontally, from front to back. Each word card has a first circular hole in a respective position corresponding to the first sound of the word, a second circular hole in a respective position corresponding to the final sound of the word, and a plurality of elongated slots in positions that correspond to the remaining sounds of the language. The use of elongated slots and circular holes is explained in detail in the Brinkmann patent incorporated by reference herein. Each card also includes a picture and spelling of the word. Additional information may also be included.

Selector cards 302 and 322 (shown in FIGS. 4A and 4B) are provided for placement at the front and back of the stack. To allow independent selection of initial and final sounds, respective selector rods are used for the initial sound and the final sound. Two sets of initial sound selector cards 302 are provided for initial allograph selection, and two sets of final sound selector cards are provided for final allograph selection. This allows placement of selector cards both in the front of the stack and in the back, for proper alignment of the selector rods.

Initial selector card 302 (FIG. 4A) includes a picture 312 of a word that includes a respective allograph in the initial position, the spelling of that word (with the pertinent sound highlighted), and a single circular hole 313 corresponding to that allograph. Final selector card 322 (FIG. 4B) includes a picture 332 of a word that includes a respective allograph in the final position, the spelling of that word (with the pertinent sound highlighted), and a single circular hole 333 corresponding to that allograph. Card 302 has an opening 314, and card 322 has an opening 334. By placing an initial sound selector card 302 and a final sound selector card 322 on top of one another, a pair of circular holes 313 and 333 is formed, corresponding to a respective initial/final sound pair.

Once the user chooses an initial/final sound selector card pair 302, 322, the chosen pair of selector cards is placed in the front of the stack of word cards. A duplicate selector card pair is placed in the back of the word card stack for proper alignment of the selector rods. One selector rod is inserted through the circular hole 313. The non-selected cards are then allowed to drop, as described in Brinkmann. All of the cards remaining on the selector rods at this point have the desired initial sound. A selector rod is then inserted through the circular hole 333, and the rod 313 is removed. The non-selected cards are then allowed to drop. The remaining cards have both the desired initial sound and the desired final sound.

The user can peruse the remaining cards to find a card having a picture and spelling of the desired word.

Other mechanical embodiments are also contemplated.

The potential benefits of the Talking Dictionary and the underlying technology are numerous. It may increase literacy. Users may learn to exercise increased control and power over their environments through the use of written language. The Talking Dictionary allows children to play with written language. It provides children with a friendly, enjoyable environment which they can explore independently, motivated by their own innate enchantment, all the while increasing their literacy. It may further increase auditory discrimination and pronunciation skills.

WEB BROWSER EMBODIMENT

A web browser embodiment of the invention ("Browser") utilizes many of the same techniques as the exemplary Talking Dictionary and exemplary Prototype, but rather than locating and presenting information pertaining to dictionary entries or animals, it locates and presents World Wide Web pages, and presents them in a manner that is understandable to an individual with limited reading ability, or potentially who has some impairment. Additionally, it introduces some new interface elements.

When a literate adult reader looks at text, he or she may scan, or visually "navigate" the text. For example, when looking at a newspaper, one may navigate a page, and select an article to read because of titles, headings, bylines, bold, italicized, or other special words that catch the eye, and typically were written intentionally to catch the eye. Additionally, a literate adult reader, after noticing emphasized words (or for any other reason), may elect to read adjacent words or any particular word. On the other hand, when a pre-literate child looks at text, he or she is typically capable of the same navigation: special words will catch the eye and be noticed, and the child may further elect to look at an adjacent (or other) word. But the similarity ends there, because although he or she may notice the same special words, these words cannot be read. Thus, a pre-literate child, an individual with no or minimal understanding of a language in its orthographic form (but knowledge of the language in its spoken form), or an individual with certain impairments, may not have even a clue as to the contents of a textual passage. They can see the indicators, but can not understand them. On the World Wide Web, with its use of hyperlinks, this difference is even more compelling. If a child were to be given this ability, worlds of information would become available. The ability to distinguish the emphasized from the normal is there; giving children the ability to exploit this distinction greatly enhances the child's ability and enjoyment.

The inventor has identified this nuance as a problem in need of a solution, and the exemplary Browser discloses a methodology that essentially solves it, in that it allows young children or other individuals with limited abilities in this area, to navigate text by ear in a manner that approaches in effectiveness the way literate adults navigate by eye.

When an individual sees textual passages on a web page, one typical behavior is to glance at hyperlinks, select one of interest, and click on it. For example, if one is viewing a page that is discussing colds, there may be hyperlinks for treatments, prevention, causes, wives tales, and pneumonia, for example. The surrounding text—possibly one or more paragraphs of discussion—may or may not be of interest, or may be of minimal or strong interest. A literate adult can choose to see a link and click, and/or read the surrounding text.

Using the exemplary textual navigation method, a child or other individual, as mentioned above, can do virtually the same thing. When a normal word within visually contiguous text is moused over, the surrounding contiguous text is pronounced. When a special word within the contiguous text is moused over, only the special word is pronounced. Thus, a child, or other suitable user, can cause the mouse cursor to flit across the screen, hearing special words on the fly, at random, and also be able to hear the entire passage at will. And if the user wants to hear a particular normal word, clicking on it causes it to be pronounced in isolation. In another variation, the user may pre-select to have all words pronounced in isolation when moused over. One skilled in the art would know how to set an indicator based on, for example, a radio button selection or other selection means, to cause such a pre-selection.

Figure 11A:
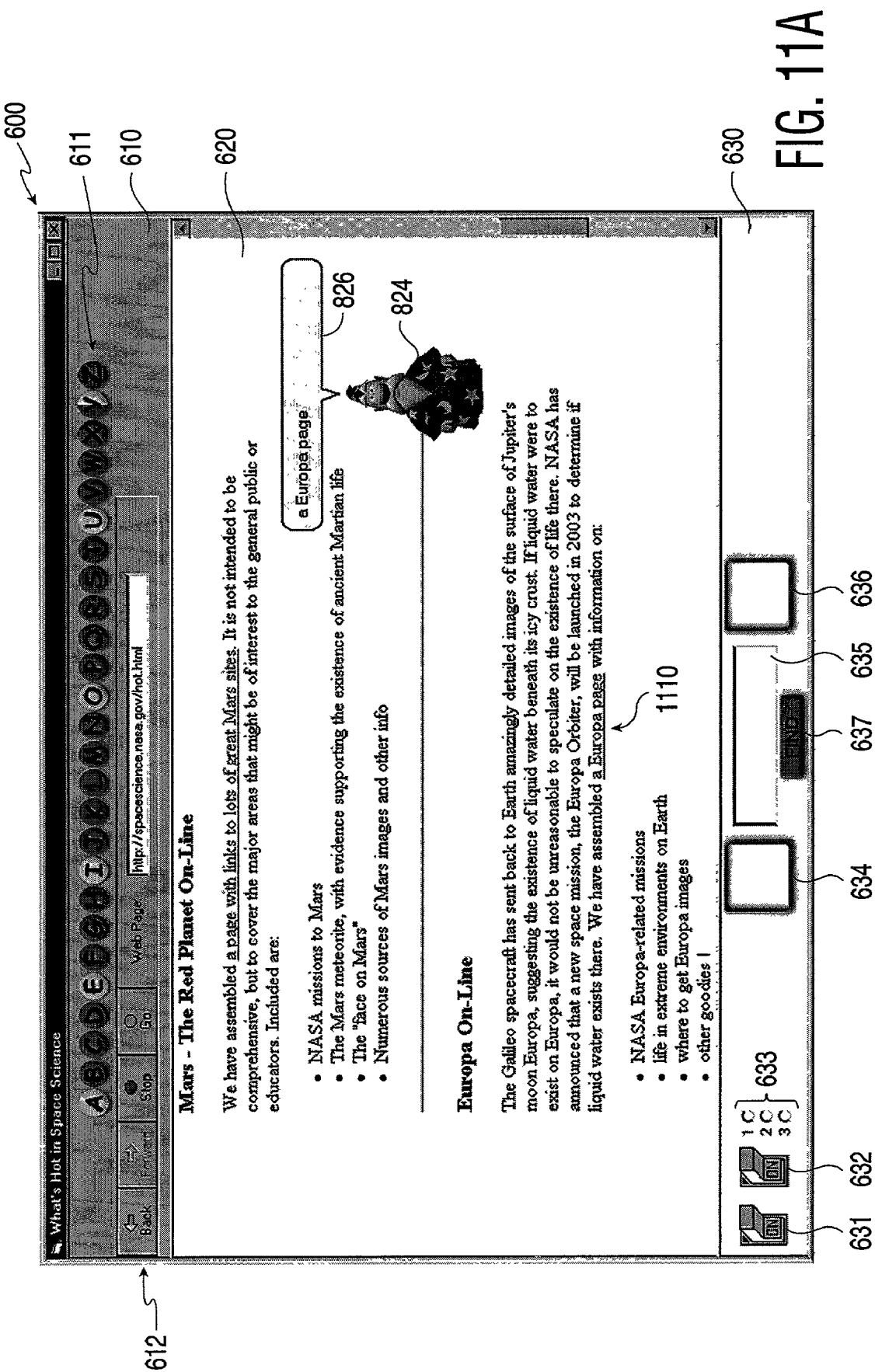
Figure 11B:
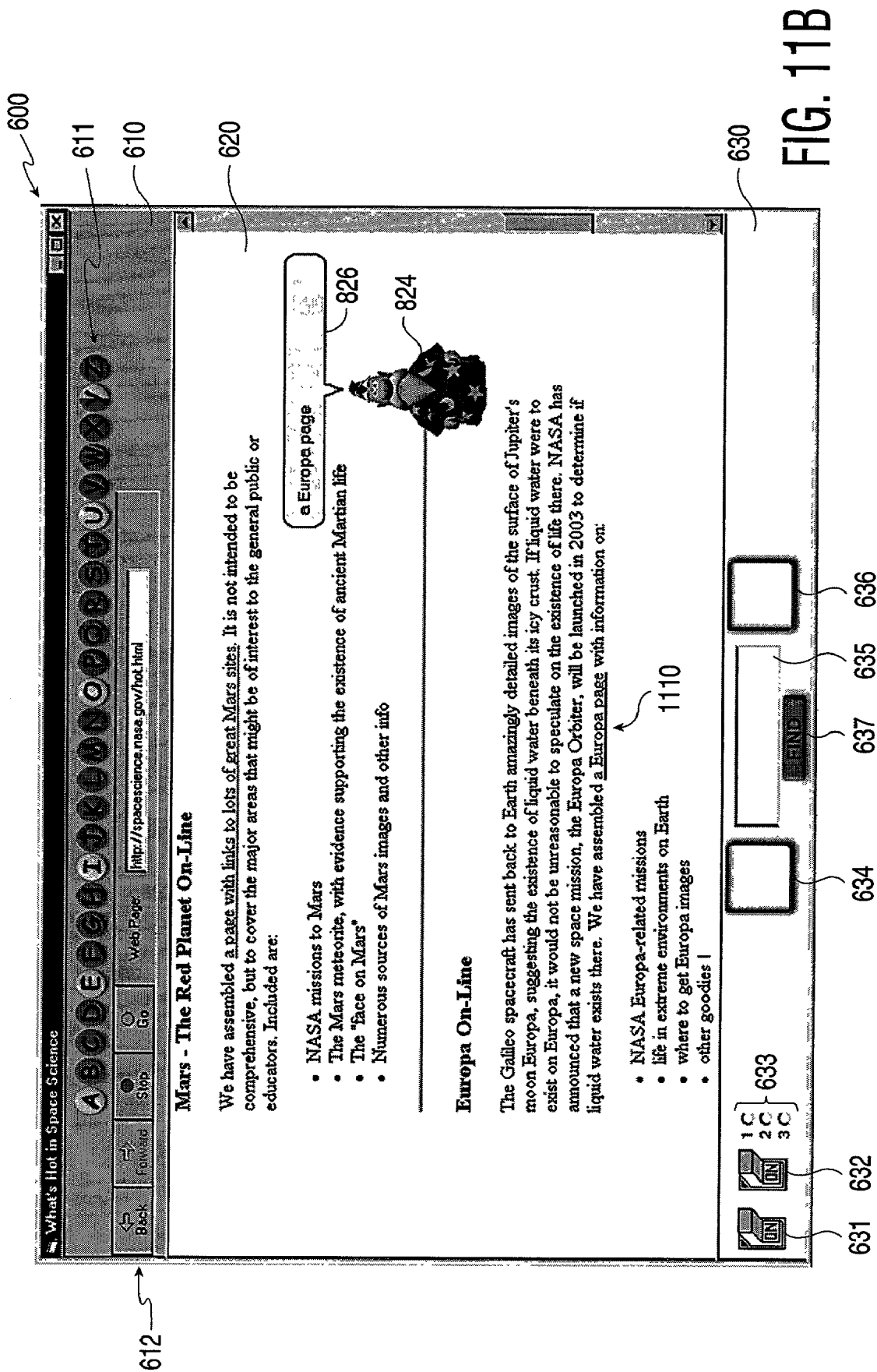

FIG. 11 is a screen print of a portion of a web page from the NASA site. Having placed the mouse cursor over the hyperlink "a Europa page" (which is at the end of a paragraph), the user hears the words "a Europa page" spoken. Similarly, a user may hear, via passive indication or Looking, each of the two headings on the page; both links on the page; any of the eight bullet points on the page; and, by placing the mouse cursor over of any normal word in either of the two paragraphs, a user may hear the indicated paragraph. The user may, for example, similar to a literate adult reader, Look at the "Mars" heading; Look at the "Europa" heading, and then elect to Look at the paragraphs and bullet items subordinate to either or both. Or, as a literate adult reader might, the user may immediately Look at the Europa link and navigate there. The user may hear, via active indication or Choosing, any word on the page. In another variation, any word in isolation may be heard via passive indication or Looking. Using the exemplary Browser on this page, a child (or other individual with limited ability to recognize and/or understand orthography), would be able to navigate to images of Mars, the Mars meteorite and evidence supporting the existence of ancient Martian life, information on Europa, life in extreme environments on Earth, and "other goodies".

Figure 12:
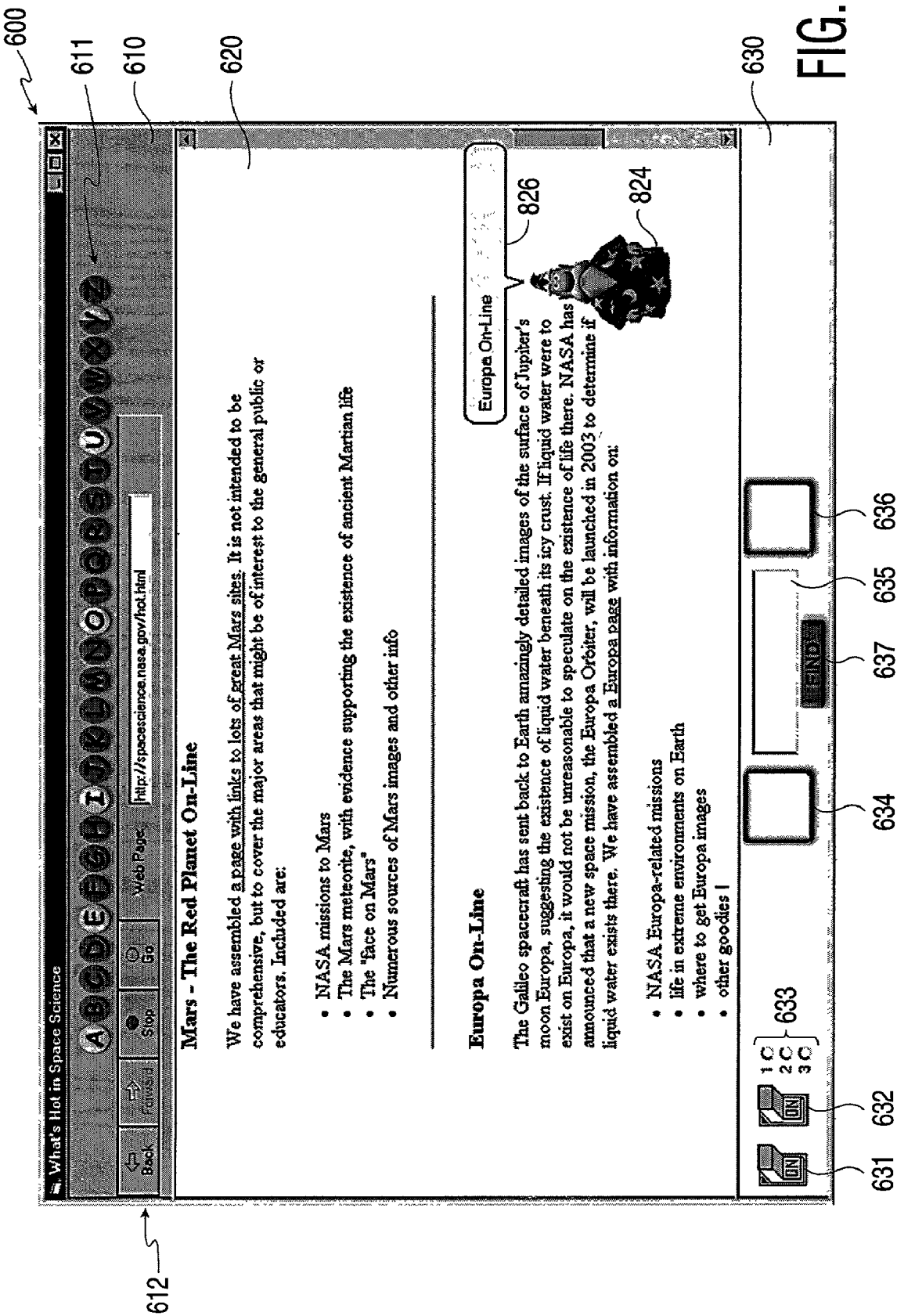
Figure 13:
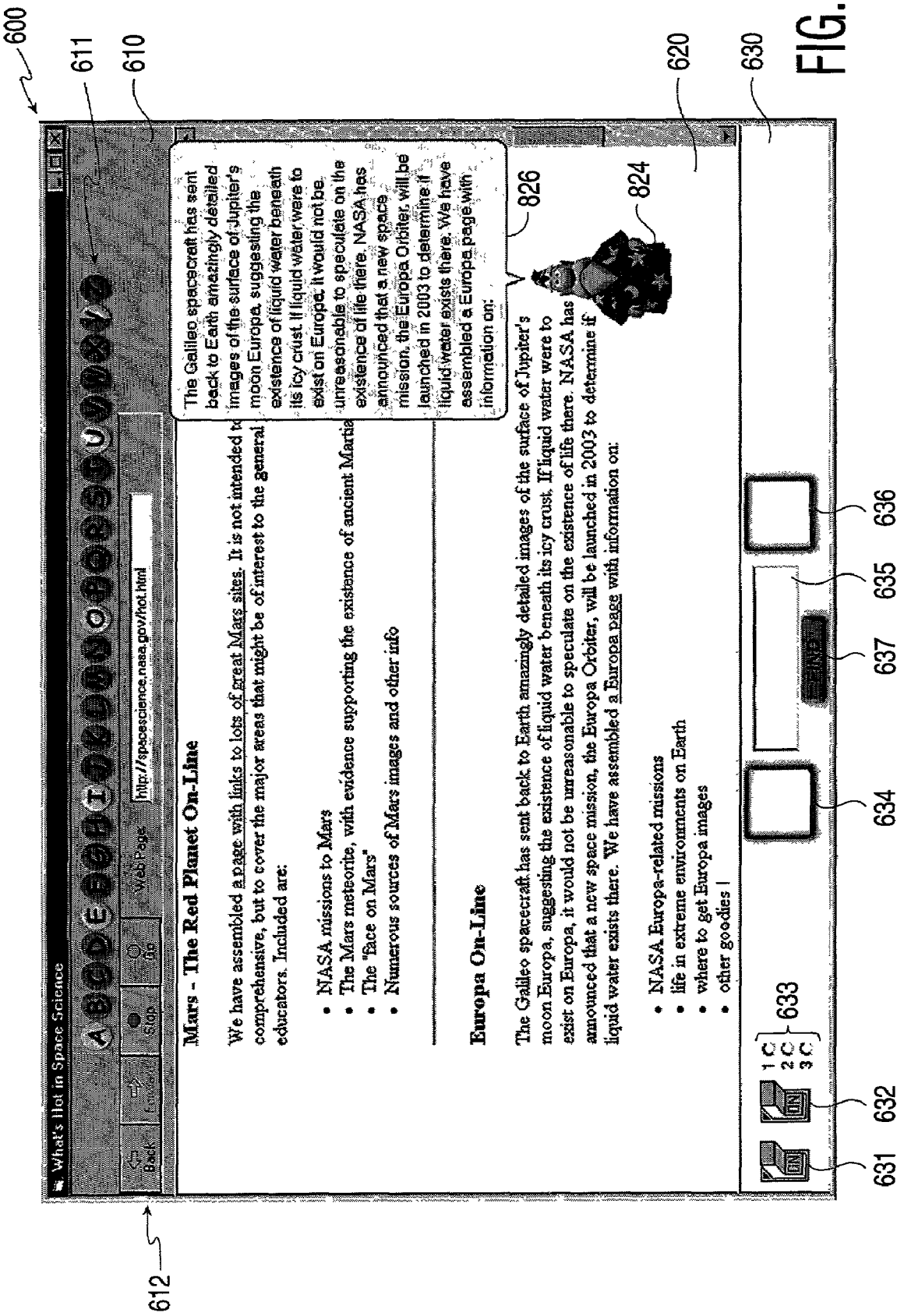
Figure 14:
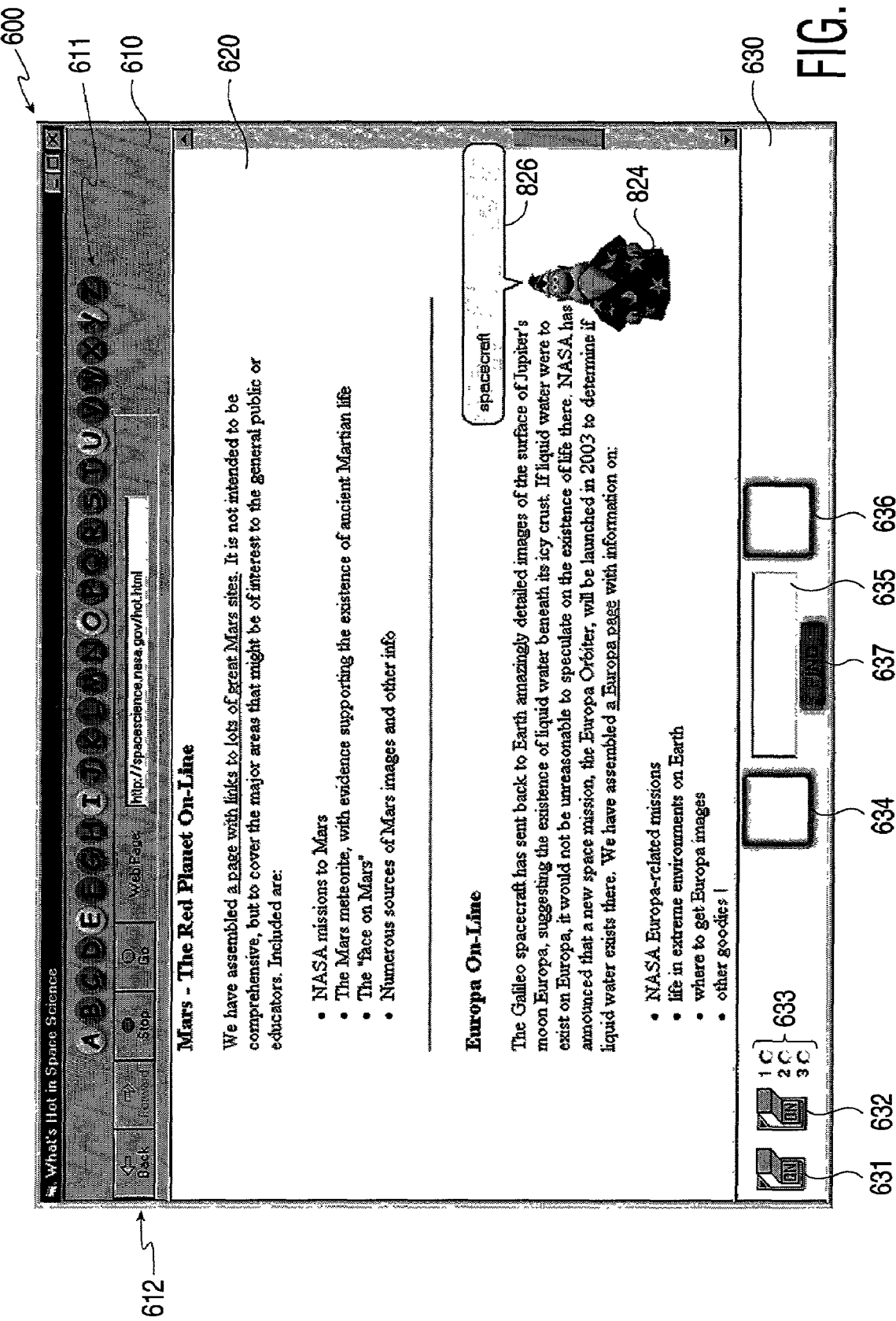

FIGS. 12, 13 and 14 are screen diagrams showing steps that may be taken by a user after viewing the screen shown in FIG. 11. In FIG. 12, the user may have noticed the heading for Europa On-Line and moved the mouse cursor over it. In response, the process pronounces the heading as shown by the Merlin character 824 and text bubble 826 in FIG. 12. After hearing the heading, the user may be interested in the paragraph and position the mouse cursor over an ordinary word in the paragraph. In response to this action, the process causes the Merlin character 824 to recite the text of the paragraph, as shown in FIG. 13. Finally the user may see the word "spacecraft" and, without being able to read it, wonder what word it is. To hear the word, the user positions the mouse pointer over the word "spacecraft" and clicks the mouse selector. In response to this action, the process causes the Merlin character 824 to pronounce the word "spacecraft," as shown in FIG. 14.

The exemplary Browser is implemented using Microsoft Visual Basic Version 6.0 Professional Edition, in conjunction with Microsoft's Browser Technology (Internet Explorer 5 development platform), and DHTML/DOM (dynamic HTML/document object model) techniques. Microsoft provides technology that allows programmers to incorporate browsing, document viewing, parsing, rendering and so on into an application program hosted in C++, Visual Basic and, possibly, other languages; this is referred to as "Browser Technology". The exemplary Browser utilizes Visual Basic to "host" a WebBrowser control—part of the Browser Technology—which comprises certain components underlying Microsoft's Internet Explorer browser. This technology, again, allows a programmer to incorporate web browsing into a custom application. Information on, and examples of Microsoft's Browser Technology may be found at Microsoft's web site, currently at "http://msdn.microsoft.com/workshop" and in the Microsoft Press book, *Programming Microsoft Internet Explorer* 5, by Scott Roberts, ISBN #0-7356-0781-8. Information on DOM and DHTML techniques may also be found on Microsoft's Web site, and discussed in the Microsoft Press Book *Dynamic HTML Reference and Software Development Kit*,ISBN #0-7356-0638-2. Human-speech auditory effects are produced using the CoolEdit 96 and 2000 sound editor, by the Syntrillium Software Corporation; text-to-speech was implemented using Microsoft's Speech SDK, and text-to-speech using animated characters was implemented using Microsoft Agent technology. Information about Microsoft's Agent technology is also available on their web site, and in the Microsoft Press book, *Microsoft Agent Software Development Kit,* ISBN #0-7356-0567-X. The target environment for the Browser includes the Windows 95 operating system or above; internet accessibility; sound board; CD-ROM drive; and speakers. For performance or other purposes, dynamic link libraries (DLLs) written in C or another compiled programming language may be utilized to accomplish certain tasks. Also, Windows applications program interface (API) calls may be declared and used if necessary to enhance performance or achieve other objectives. As an alternative to Visual Basic, another programming environment such as C or C++ may be used. One skilled in the art would also be able to identify and use other sound editors, and text-to-speech tools.

Navigation to web pages can be accomplished either by entering the pages' URLs, as in the popular browsers, such as Internet Explorer or Netscape Navigator, or via finding a word from a word list of approximately 14,000 words, using one or more phonemes (or sounds) in the word, or orthographic information—as discussed regarding the exemplary Talking Dictionary and Prototype—and then submitting the word to a Web search engine (or other searchable site) to locate pages with information corresponding to the selected word.

In a variation, the word list may contain fewer words, more words, and/or lexical items comprising more than one word, such as a name or title. In another variation, methodology may be employed to accumulate words or lexical items, and then submit a plurality of words or lexical items to a search engine.

Figure 6:
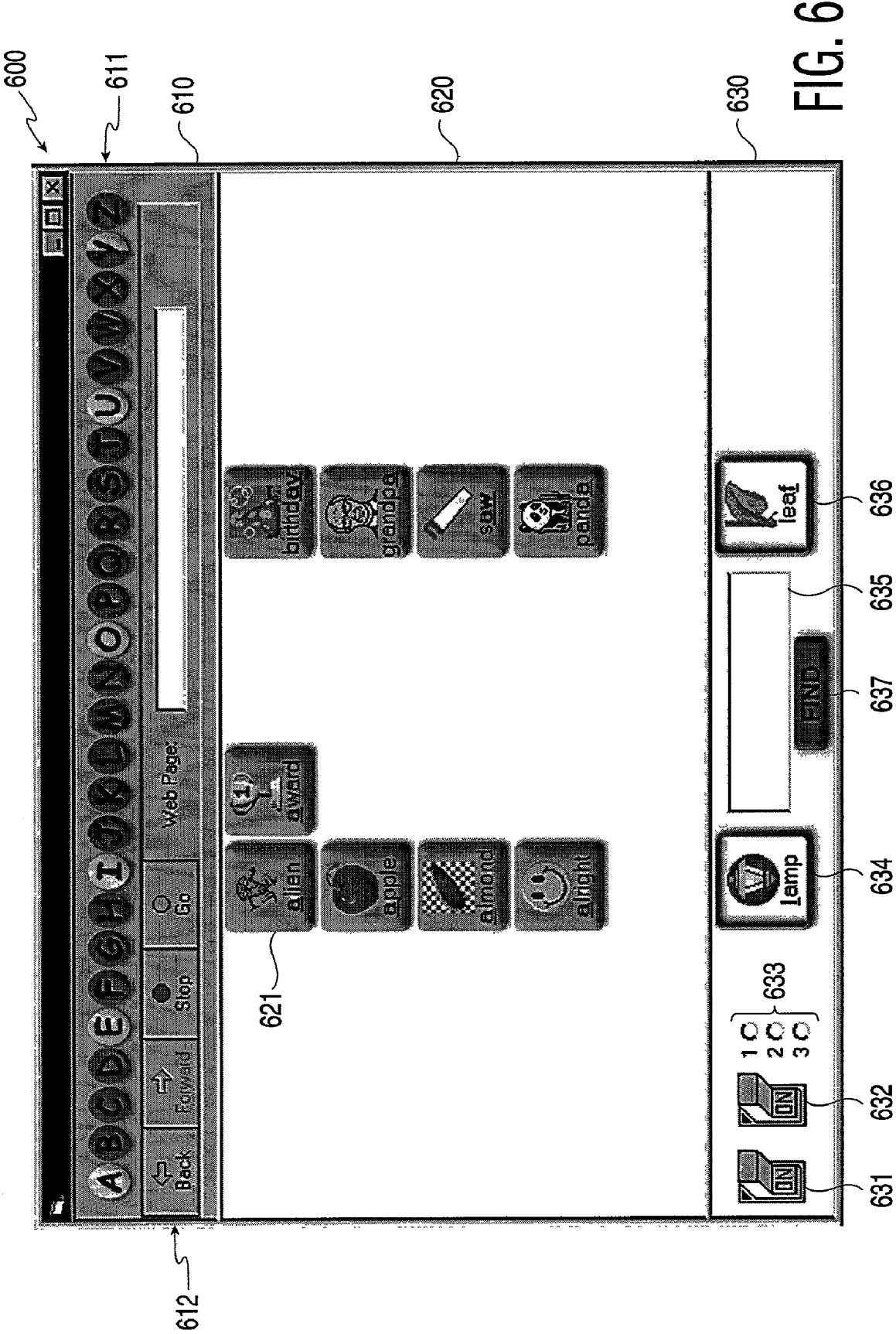
FIG. 6 is a diagram of an alternate computer display executing a process according to the present invention within a browser for a global information network.

FIG. 6 is a screen image 600 of the present invention executing an exemplary Browser program in accordance with the invention. The Browser shown in FIG. 6 comprises 3 major subcomponents: a top component 610, a main component 620, and a bottom component 630. The top component further comprises an alphabetic strip menu 611, and a navigator bar 612. The main component is shown displaying initial allograph indicators 621, and final allograph indicators 622; it is also used to display a word list grid, various selection menus of the inventive process, and World Wide Web or other compatible pages. The "ZOrder" and "Visible" properties, known to those skilled in the art, which are applicable to a variety of Visual Basic controls, are used, when necessary, to cause the desired objects to be shown, at the appropriate times, in the main component 620 of the screen image.

The operation of the exemplary Browser is discussed in two sections: finding a word and navigating to a web page; and the presentation and operation of a web page.

Finding a Word and Navigating to a Web Page

The alphabet menu functions in the same manner as previous embodiments, except that when a letter is selected, the corresponding allographic display tiles indicate both initial and final sounds concurrently. The tiles are displayed such that they are located above their respective targets, i.e. the initial indicators above the initial allograph box, and the final indicators above the final allograph box. This may provide a benefit to some users, in that the juxtaposition implies a relationship. Additionally, fewer steps are required to select initial and final sounds, making the process quicker, and physically easier to repeat, which may reduce physical strain. These features may incrementally facilitate use.

The back, forward, stop and go buttons of the navigator bar 612 perform the same functions as in a standard web browser. When the cursor of a pointing device is passed over them, however, their respective functions may be (depending on other settings) articulated by a digitized human voice or, alternately, a computer synthesized voice. The "Web Page" text may similarly be articulated. This articulation indicates the function of a potential selection, and thus facilitates use by users with limited understanding of a language's orthography, or users with certain impairments, such as visual impairments. It may also make use more fun.

The allographic indicators 621 and 622 may also be articulated when a cursor passes over them. The information presented via this articulation may vary, depending, again, upon other settings. If a cursor passes over the "alien" allograph indicator tile 621, for example, a voice may state "a can make the sound /long a/ as in alien." Alternately, it may state "/long a/, alien". When a selection is chosen by, for example, clicking a button of a selection device pointer, the sound (or phoneme) associated with the allograph is selected, and the selected allograph indicator is displayed in its respective allograph box. It should be noted that there is not a one-to-one correspondence between sound and phoneme. For example, the sound at the end of the word "box" may be perceived by some as /s/, and by others as /s/. The exemplary Browser may allow for retrieval of the word by either. Since one of the goals of the invention is literacy, the embodiment may allow, whenever practicable, the choice of a sound via the letter which represents it in a particular word. So, for example, if the word "box" is desired, selecting the letter "x" may produce an allograph that corresponds to the sound /ks/, which is not one distinct phoneme.

With respect to the bottom component 630, switch 631 toggles the navigator bar on and off. The presence of the navigator bar increases functionality, but adds some complexity which may be distracting under certain circumstances, such as if the Browser is being used by a young child. The absence of the navigator bar removes this complexity and also increases the available viewing area of the main component 620, which may be of particular benefit, for example, to users executing the Browser on a 640×480 video display.

When a pointing device cursor passes over this switch, its function may be articulated; a textual indication of its function may also be displayed in response to this action.

Switch 632 toggles "button hints" on and off. Button hints are the articulation of a button's function when a selection device cursor is passed over it. When a pointing device cursor passes over switch 632, for example, its function may be articulated; this switch, too, may present a textual indication of its function in response to this action. Typically, the spoken description of the function comprises the word(s) on the button or other component, but under certain conditions, a more detailed description may be presented. Speaking only the word(s) has the benefit that the user, if he or she doesn't know the orthography, but knows the word(s), will be taught the orthography or at least have it reinforced.

Radio buttons 633 select language hints levels. When level 1 is selected, the information articulated about an allograph may be fully described. When level 2 is selected, only a hint may be given. When level 3 is selected, there may be no articulation at all. Additionally, the alphabet buttons may also be controlled by these levels, being articulated at levels 1 and 2, and silent at level 3.

Initial allograph 634, word box 635, and final allograph box 636 perform the same functions as their counterparts in previous embodiments. The "find" button 637 initiates retrieval of words from the word list matching the initial and/or final sound. When a selection device pointer is passed over the allograph boxes, the word box, and the find button, the respective functions of each may be articulated, and in the case of the allograph boxes and word box, a textual indication may be displayed as well.

The pervasive and immediate articulation of virtually all textual elements in response to a comparatively passive action, such as a selection device rollover, creates a paradigm, that, rather than point-and-click, may be thought of as point, receive feedback, select. The point-and-click paradigm presumes that the user can read, and is aware of the selection before moving a mouse (or other pointing device) to a selection. This technique provides children in particular, as well as others with limited textual knowledge of a language, or who have an impairment, the ability to peruse with their ears what readers can peruse with their eyes.

Figure 7:
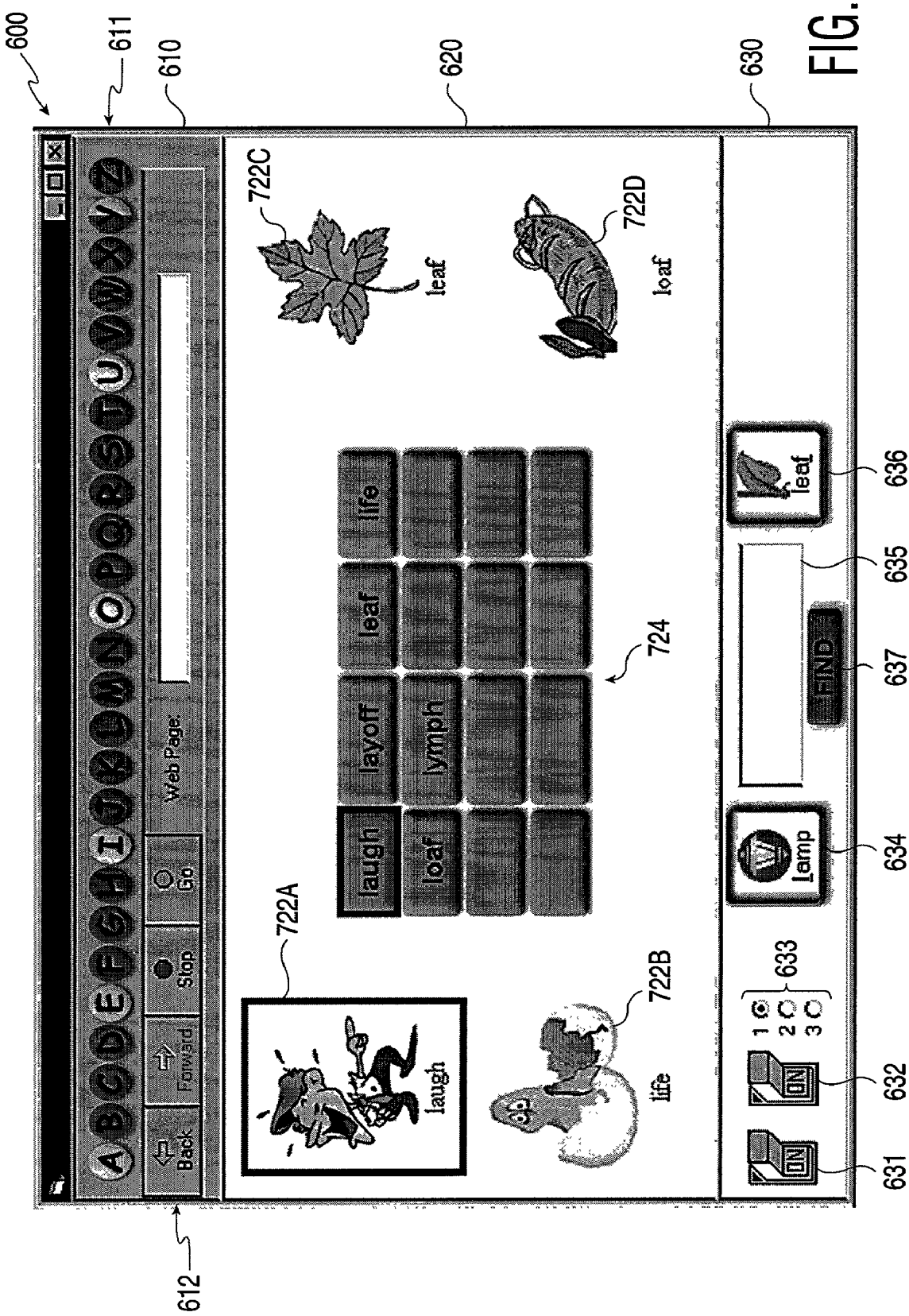
FIGS. 7, 8, 9, 10, 11A, 11B, 12, 13 and 14 are diagrams of further computer displays that are useful for describing the browser embodiment of the present invention.

Operation is now described with reference to FIG. 7. FIG. 7 is a screen print which contains the word grid 724 displayed within the main component 620. This grid is presented, for example, after the user has pressed the "find" button, having previously selected initial sound /l/ and final sound /f/. With 14,000 words, some of them long, some which do not readily lend themselves to pictorial representation, and taking into consideration that there are still many 640×480 pixel displays in use, the grid is presented as a variable number of word tiles, with the tiles proportionally sized to accommodate the largest word in a column. Pictures 722a–722d, when appropriate, may be displayed in proximity to the grid, and may further be juxtaposed to a duplicate presentation of the represented word. When a selection device cursor is passed over a word or picture, it is pronounced, and information about it may also be spoken. Additionally, the word and corresponding picture are highlighted.

In another variation, one skilled in the art would know how to create a means for enabling/disabling the audio and the highlighting, or for varying the audio that accompanies the words, for example, by modifying additional information or otherwise changing the content of the spoken audio.

The word grid of FIG. 7 is produced via HTML and JavaScript, residing either on the client or a server. Each initial/final sound pair for which there are entries corresponds to one or more HTML files/pages, where the filename of each file indicates the sound pair to which it corresponds (in the case of multiple pages, a "next" and "last" arrow are displayed beneath the grid 724), and when the "find" button is pressed, the first (or only) page of the corresponding HTML is retrieved and displayed. There is also one HTML file group (one or more files/pages) for each initial and final sound for which there are entries. The combinations of initial/final and initial and final sounds correspond to thousands of pages. The HTML pages themselves are generated from the word list using the Perl programming language. One skilled in the art of web page creation would be able to create HTML/JavaScript to display words and pictures. One skilled in the art of programming with Perl would be able to use associative arrays, perl regular expressions, and other techniques to generate HTML pages from a word list, pictures corresponding to words in the word list, and phonetic representations of the words in the word list. Alternatively, other languages than Perl may be used to generate HTML files.

In another variation, HTML for the grid is dynamically generated on the client or server using JavaScript or VB Script or some other means of on-the-fly generation. In another variation, HTML is not used for presentation of the grid. Instead, a Visual Basic Picture Box control serves as the container for the grid, and image controls serve to hold the grid tiles and pictures. One skilled in the art would realize that there are many ways and tools that may be used to present the grid, within a Visual Basic environment or other programming environment.

The exemplary Browser utilizes JavaScript to intercept mouseover events and perform the highlighting, and to intercept mouseclick events on the "next" and "last" arrows to navigate to multiple pages within the current initial/final, or initial, or final sound group (intragroup navigation), when necessary. The Visual Basic hosting application also intercepts these events. It produces the audio representations of the words using Microsoft Direct Text to Speech, and navigates to a subsequent page (i.e. a page representing a different stage of the application, rather than a "next" or "last" page of a sound group) or activity when a word or picture is selected. (Alternately, digitized human voice may be used for word pronunciation.) This interception is accomplished using a technique called "sink events." One skilled in the art would understand this technique, and also that there are alternate ways to intercept events. The HTML of the grid pages is coded using a table containing images (encoded according to the graphics interchange format, i.e. "gifs"), text, and so forth. The exemplary Browser distinguishes between an HTML page which is intended specifically to operate in conjunction with the Browser ("application HTML page") from a "regular" web page by using the LocationURL property of the WebBrowser control, and detecting whether it matches the expected URL of the application HTML page. Alternately, a different indicator could be used. One skilled in the art could easily implement such a method of indication. Since the hosting Visual Basic application is "aware" of the HTML coding and juxtaposition of elements within the HTML of an application HTML page, it "figures out" what to speak in response to a mouseover event, where to navigate in response to a selection, and so on. It can detect, for example, whether the cursor is over an image or an HTML anchor element, and then locate the corresponding word using DHTML and/or DOM techniques. A individual skilled in the art would understand how to detect the HTML source element of an event and locate text and other information from related HTML elements.

Figure 8:
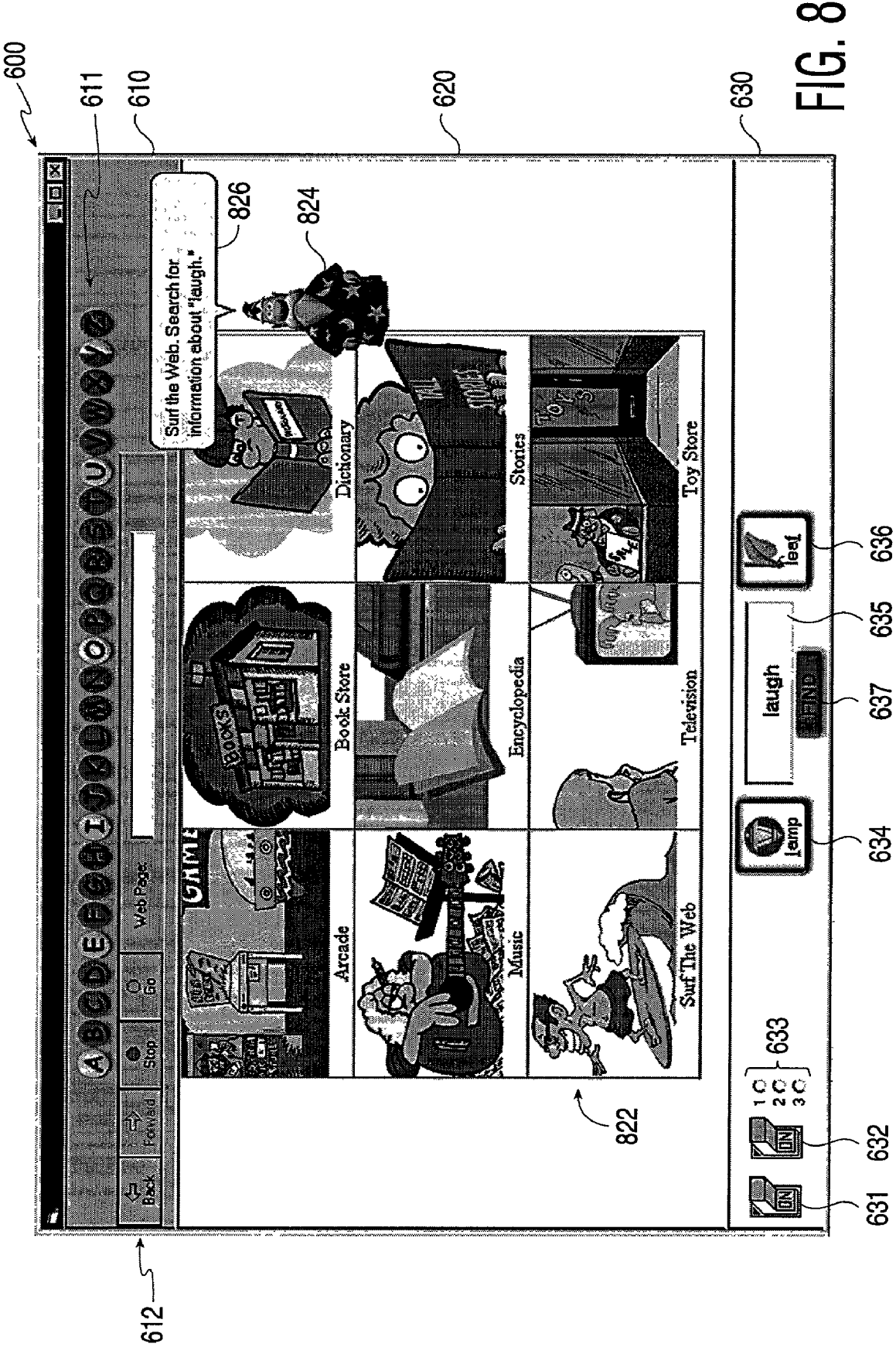

When a word or picture of the grid is selected by, for example, clicking a button on a selection device, a menu of categories is displayed, as illustrated by the screen print of FIG. 8, wherein the user has selected the word "laugh." This is also an application HTML page which the hosting application "understands." When the hosting application detects that the page has finished loading, it sets the innerText property of a hidden HTML SPAN element, <span style='display:none'id='curword'>laugh </span>, to the selected word (in this case "laugh") using the element's ID property to identify it. An individual skilled in the art would understand how to write to an HTML document from a hosting application. This word can then be accessed via JavaScript on the HTML page. Articulation and navigation from this page are performed using JavaScript. When a selection device cursor passes over a category, the name of the category is spoken. Additional information may also be spoken. FIG. 8 shows the Merlin character 824 of Microsoft Agent speaking, via text-to-speech, the contents of the word balloon in response to the cursor moving over the "Surf The Web" category 822, saying "Surf the Web. Search for information about 'laugh.'" One skilled in the art of Microsoft's Agent technology would know the steps needed to utilize Merlin in conjunction with a web page and have him articulate text. One skilled in DHTML/DOM manipulation techniques would know how to access the innerText or other element property. This menu provides a means for the user to select a target category for the selected word. Displaying the words as they are spoken allows the user to associate words that he or she may know, with their orthographic representations, which may teach or reinforce this association. Use of an animated character may make the experience rather enjoyable, particularly to children. Alternately, this may also be accomplished by highlighting or displaying words as they are spoken without an animated character, or simply utilizing text to speech or digitized voice with or without corresponding ancillary text. One skilled in the art would know that there are other Microsoft Agent characters, other technologies which provide for animated characters and text-to-speech, and that one can design a custom character.

In another variation, the category may be selected before the word is selected. This may be useful if the user knows, for example, that he or she is only interested in targeting a particular category. In this case, the selection of a word from the grid would only be applied against entries within the pre-selected category, and this menu would not be displayed at this point in the process. In a variation such as this, it may be helpful to display an indication of the pre-selected category by displaying, for example, a representative icon in a designated portion of the screen.

Figure 9:
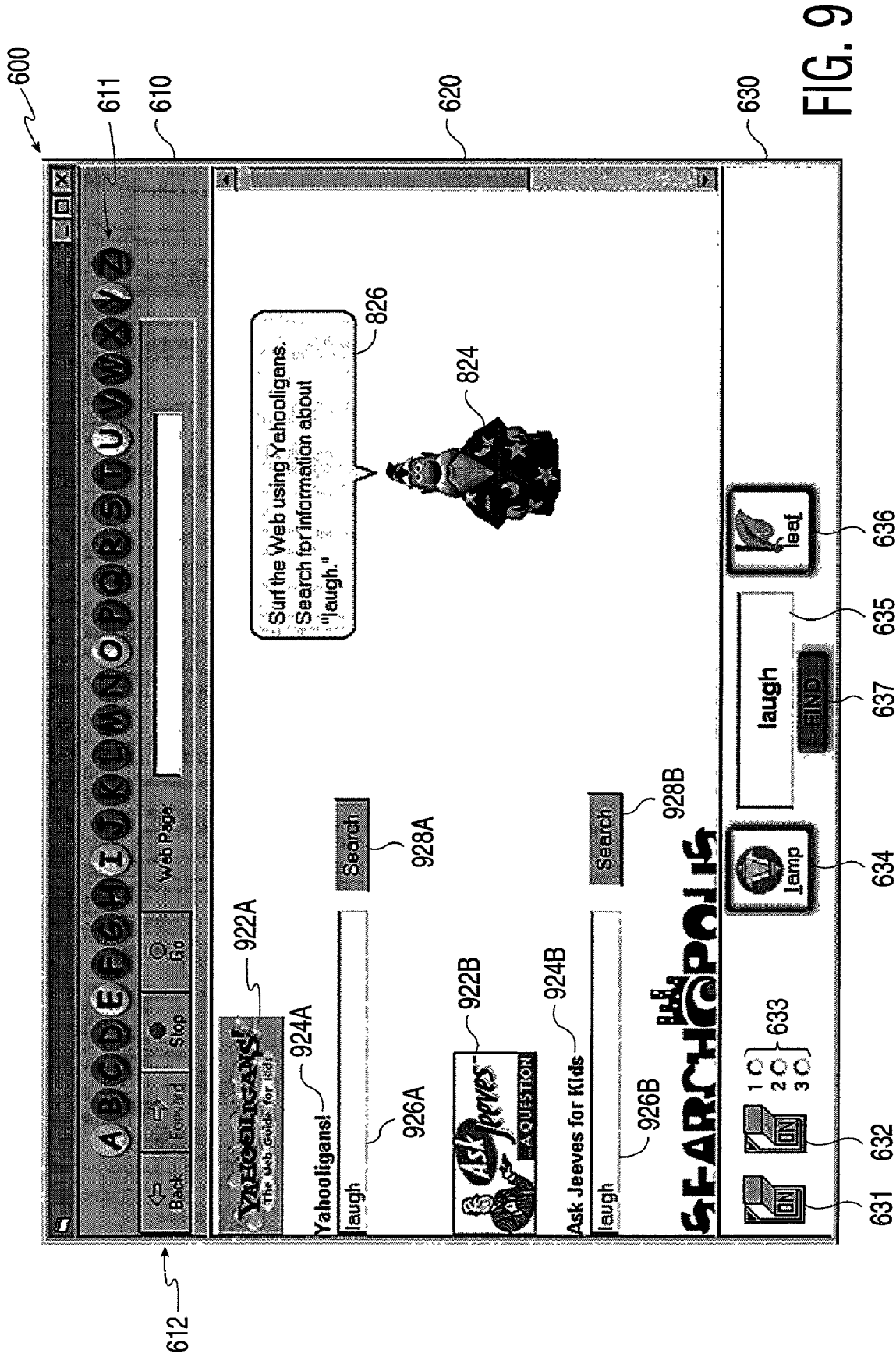

Once a category is selected by, for example, clicking a button on a selection device, entries within that category are displayed, as illustrated by the screen print of FIG. 9, which depicts several children's search engines, preset to search on the word "laugh" (this page is also an application HTML page). All trademarks and service marks shown in FIGS. 9 and 10, and in the specification are the property of their respective owners. The logos displayed are for example purposes only, and do not indicate any affiliation between the inventor and the trademark or service mark owner.

The word "laugh" is written to the innerText property of a SPAN element, as above, and also to the text boxes 926a and 926b. Alternately, other representative pictures may be used, or no pictures at all, or the inventor may employ a specially built proprietary search engine. In FIG. 9, when the cursor is placed over the Yahooligans™ logo, the Merlin character 824 speaks "Surf the Web using Yahooligans. Search for information about 'laugh'", as shown in text bubble 826. When the cursor passes over the text box, the word in it (in this case, "laugh") is pronounced by Merlin. In HTML terms, the text boxes are INPUT elements of type=text. When the cursor passes over the captions above the text boxes, the respective caption is pronounced. When the cursor passes over the search button, Merlin states "Search for information about 'laugh.'" In HTML terms, this button is an INPUT element of type=submit. Both elements reside within an HTML FORM object. One skilled in the art of programming web pages using HTML and script would know how to create a FORM object with these INPUT elements, and navigate to the associated URLs if the buttons are selected. Similarly, one with this skill would know how to navigate to a URL associated with an image.

When a search engine is selected, for example, by clicking a button of a selection device while its cursor is over its associated image or search button, a search on the currently selected word is submitted to the associated site, Yahooligans™ in this example. An individual skilled in the art would know how to submit a search to a site that is set up for searching, such as search engines, various e-commerce sites, sites which contain reference material, and so on. One skilled in the art of search engine technology would additionally know how to index a site that is not set up for searching, in order to facilitate a search on that site.

In a variation, selecting an image would navigate to a page of the selected site without submitting a search, and selecting the search button would submit a search to the site.

In another variation, the site may be selected prior to the word. This may be useful if the user knows, for example, that he or she is only interested in targeting a particular site, such as, for example, a particular search engine, e-commerce site, or reference site. In this case, the selection of a word from the grid would be applied only against entries within the pre-selected site, and the site selection menu shown in FIG. 9 would not be displayed at this point in the process. In a variation such as this, it may be helpful to display an indication of the pre-selected site by displaying, for example, a representative icon in a designated portion of the screen.

Figure 10:
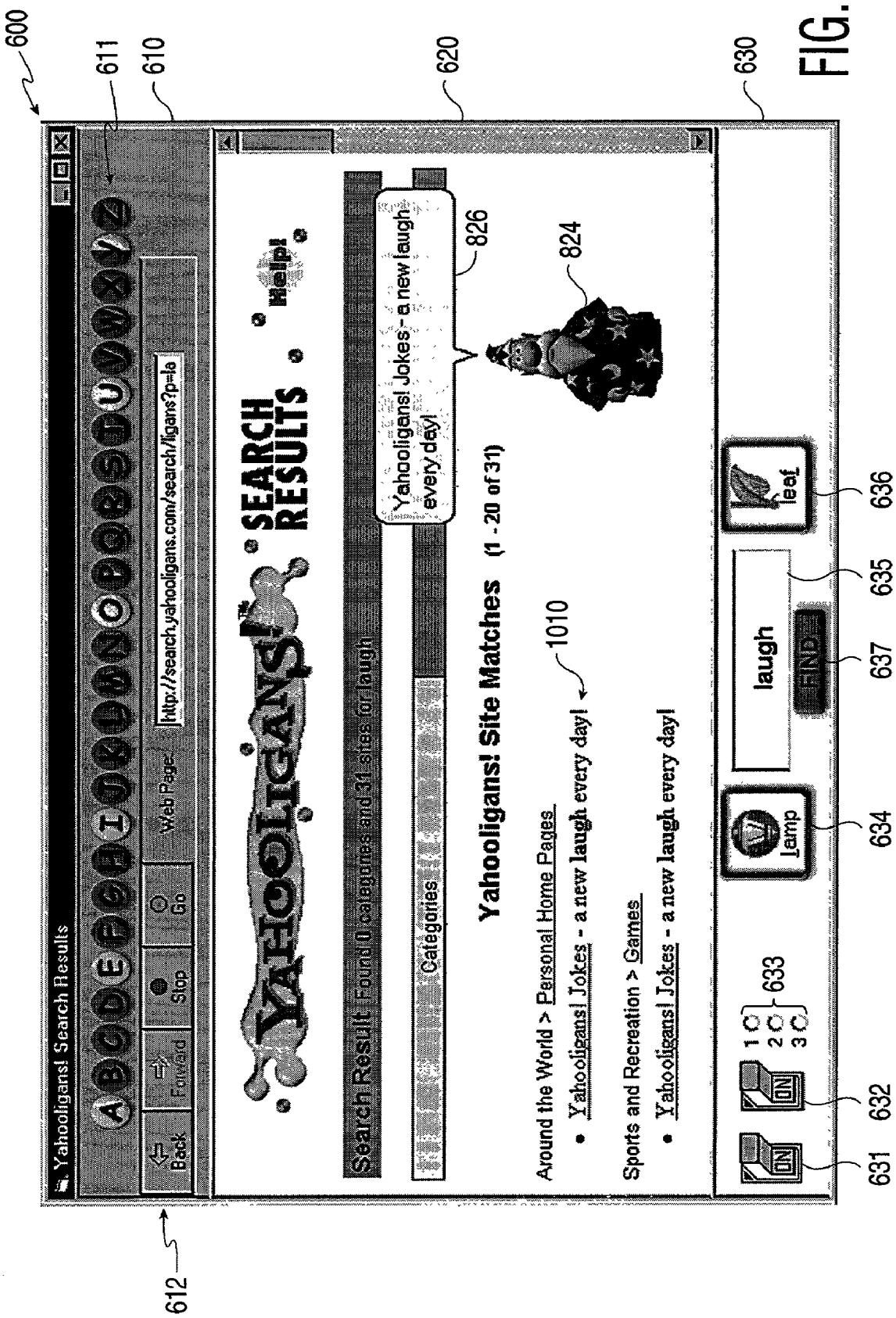

Selection of a search engine causes the selected word to be submitted to that search engine, and causes the results to be displayed as depicted in the screen print of FIG. 10, which shows Yahooligans™ after a search on the word "laugh." At this stage, displayed pages are no longer application HTML pages. The results, at this point, are the same as if the user had, using typical browser URL entry techniques, navigated to Yahooligans™, and searched on the word "laugh."

Presentation and Operation of a Web Page

FIG. 10 is a screen print of the exemplary Browser displaying the Yahooligans!™ children's search engine, with Merlin speaking the text under the mouse cursor. (The terms "mouse", "mouse cursor", "mouseover", "mouseout", "mousemove", "mouseclick", "rollover", and so on, as used throughout this document, refer both to a literal computer mouse and associated terms, and also their analogues, such as, for example, a trackball, finger pad, remote device, and any device capable of causing both an indication of a selection by, for example, placing a cursor over an object, and an actual selection by, for example, clicking a mouse button with the cursor placed over an object, on a medium which may contain images or text. These actions, often referred to as "point and click" also carry additional meanings: an indication achieved via moving a mouse—or mouse analogue—may be construed as "passive indication" or "Looking", whereas a mouse click or its analogue may be construed as "active indication" or "Choosing".)

As stated above, a user may navigate to this web page using an exemplary finding technique, or by using "standard" web browser navigational techniques, such as entering and navigating to a URL, or navigating to a web page via a saved indicator, known as a "bookmark" in Netscape Navigator and a "favorite" in Microsoft Internet Explorer. One skilled in the art would know how to save selected URLs in a list, such that a user may subsequently display and navigate to them.

FIG. 10 shows text and images from the Yahooligans web site, and depicts Merlin 824 speaking "Yahooligans! Jokes—a new laugh every day!" as shown in text bubble 826. Placing the mouse cursor over any "normal" part of this text causes Merlin to speak this phrase. On the other hand, if the cursor is placed over "special words", such as Yahooligans! Jokes, or laugh, only those words are spoken. "Special words" means words that are, for example, underlined, bold, italicized, hyperlinks, presented in a different colored typeface, or stand out in some particular way. "Normal words" comprise the other words and punctuation.

The means used to achieve this effect within the exemplary Browser is now described. The notion of "units of contiguous text" needs to be understood from both a conceptual and functional perspective. From a conceptual perspective, contiguous text includes, for example, a paragraph, a caption, a bullet point, a list item, a heading, a sentence fragment above an image, a sentence fragment below an image, and so on. In essence, anything that "looks" visually contiguous, is a contiguous text unit. From a functional perspective, contiguous text (i.e. a contiguous text unit) begins with the first word on a web page, and ends when a "contiguous text terminator" is encountered. The next piece of contiguous text begins with the following word (or letter, acronym, etc.), and, again, ends with a contiguous text terminator. From an HTML point of view, however, there is some ambiguity about what might comprise a terminator, partially due to the nature of HTML, and partially due to coding practices used for "legacy" pages which were not designed with the exemplary Browser in mind, but may contain information of interest to the user. As one example, the IMG element, which is used to present an inline image, may contain a very small image that is similar in size to the surrounding text or, seemingly more often, an image that causes the text to become discontiguous. In this case, a decision was made to treat an IMG as a terminator. Another example is the BR (break) element, which is considered an inline element, and, to the inventor's understanding, was designed for formatting purposes, for example, to end a line in a poem. However, it is also—and possibly predominantly—used intentionally to separate pieces of text such that they appear as distinct units when rendered; and is sometimes used twice in a row (<BR><BR>). The better trade-off here seemed to be to treat this as a terminator.

The WebBrowser control contains methods, properties, and events, known to one skilled in the art. One such event is NavigateComplete 2 which, according to Microsoft's online documentation, "occurs after the WebBrowser control navigates to a new URL."

It is within the handler for this event that the first step in gaining access to an HTML document occurs. Alternately, it could occur in DocumentComplete. One skilled in the art would know how to gain access to an HTML document (page or frame) and also receive notification of events pertaining to the document, such as mouse events; there are a number of ways in which this may be accomplished. This is also discussed in *Programming Microsoft Internet Explorer* 5, mentioned above, and in articles on Microsoft's web site.

The exemplary Browser uses a method for intercepting events known in the art as "sinking events". It gains access to HTML documents and sets up to receive events as follows:

1. A Visual Basic class module (named "DocumentHandler") is created. In the declarations section of this module, a public "with events" variable to hold an HTML document is declared (named "WebDoc", of type HTMLDocument). This module also contains associated handlers for onclick, onmouseout, onmouseover, and onreadystate document events associated with WebDoc. When a document is subsequently loaded into WebDoc, events relevant to that document (and that bubble up the document hierarchy) cause the corresponding handler to be called. A public string variable is also declared and named "ParentURL".
2. In the declarations section of the form that holds the WebBrowser control, a collection (named "DocumentHandlerCollection") is declared.
3. Within NavigateComplete2, an instance of DocumentHandler is created and added to DocumentHandlerCollection, with pDisp.document being assigned to the WebDoc variable of that instance. The WebBrowser's current LocationURL is assiged to ParentURL. These assignments occur each time this handler is called. Also, "expired" instances are removed from the collection. This is done by comparing the current LocationURL to the LocationURLs held in each instance of the collection. If they differ, the instance is removed. However, the inventor has found that, due possibly to a race condition, or for some other reason, occasionally this technique removes an instance that has not expired. To compensate, a defensive programming technique is employed that leaves several of the "most recent" instances in the collection, even though they appear to have expired. In a variation, code may be added to limit the number of instances that the collection can hold, by removing a certain number of instances if the collection exceeds a certain size. An individual skilled in the art would understand classes and collections.
4. As a document is being "loaded" into a page or frame, it passes through several "readystates"; and each time a readystate changes, the "onreadystatechange" event handler is called that corresponds to the WebDoc variable to which the document was previously assigned. When the readystate="complete", the document is considered completely loaded, and its underlying HTML may be safely accessed.

When readystate="complete", code (within the onreadystatechange handler) is invoked that searches through the document and encapsulates contiguous portions of text within an HTML element called SPAN, which is a generic text container. Alternately, other elements may possibly be used, such as the FONT element, for example, with no attributes set. Additionally, substantially all words contained within appropriate text-containing elements in the document are also encapsulated within SPAN elements. In another variation, substantially all words are not so encapsulated.

At this point, various HTML elements are examined for chunks of text that would be considered, by the above functional definition, to be contiguous text units. The elements currently examined are: BODY, B, BLOCKQUOTE, CENTER, DD, DEL, DIV, EM, FONT, FORM, I, INS, LI, NOSCRIPT, P, PRE, TD, TH and U. Included in these elements are elements that were determined, from at least one page, to contain more-than-acceptable amounts of contiguous text units (in other words, text units that 1) appear to be visually distinct when rendered, and 2) may be contextually distinct to the point where articulating them as one string would be unnatural). Some of these elements may not need examination, and may be removed from the above list, but examining them seems to be harmless. In a variation, a different set of elements is utilized. Chunks of contiguous text are determined by examining the contents of these elements for text nodes and/or other text-containing HTML elements followed by a text terminator. An individual skilled in the art would understand how to access elements and locate text nodes and other text-containing nodes/elements within the elements. These chunks, when found, are then encapsulated within SPAN elements. The intention of this encapsulation is to place distinct contiguous text units within distinct HTML objects for subsequent articulation. The basic process is:

1. Loop through the nodes (just the direct descendents) of an element.
2. If a text terminator is found subsequent to more than one non-terminator nodes, then insert a SPAN element before the first non-terminating node. The createElement and insertBefore DOM methods may be used for this.
3. Move the non-terminating nodes into the SPAN element. The insertBefore DOM method may be used for this. An individual skilled in the art would understand the use of createElement, insertBefore, and other related methods.
4. This process repeats till the all nodes in the element have been examined.
5. For certain elements which may contain a truly unwieldy number of contiguous units, as well as other non-textual elements, the entire contents of these elements may be, for example, encapsulated within a SPAN element, whether a terminator is found or not. Currently, these elements are the <P > and <TD > elements. In another variation, they may not be so encapsulated.

Text terminators are determined as follows: if the nodename of the node being examined is !, #text, A, ABBR, /ABBR, ACRONYM, APPLET, B, BASEFONT, BDO, BIG, BUTTON, CITE, CODE, DFN, EM, FONT, I, IFRAME, KBD, LABEL, MAP, OBJECT, Q, S, SAMP, SCRIPT, SELECT, SMALL, SPAN, STRIKE, STRING, STRONG, SUB, SUP, TEXTAREA, TT, U, or VAR, then the node is not a terminator; otherwise, it is.

The exemplary Browser applies the "tags" method to the "all" collection of the document's BODY, within a "for" loop, to retrieve the elements to be examined; and another "for" loop to examine the childNodes within each element. An individual skilled in the art would understand that there are a variety of ways to retrieve references to desired elements, and different looping techniques for both retrieving elements and examining their child nodes. In a variation, a different set of elements may be utilized as terminators.

Note that IMG and BR (and possibly other elements) which may, in fact, not interrupt the flow of contiguous text, are not included, because they also may interrupt the flow of text, and this appears to be the preferable trade off, at this point. The lists above are subject to revision. In a variation, virtually all text-containing elements may be included within the group of elements to be examined for contiguous text units.

Once the HTML is reformatted, as above, each element within the document's BODY, as well as the BODY itself, is examined for child text nodes, and each word (from a programmatic point of view, a word is a string of non-whitespace characters bordered by white space) within each text node is encapsulated within a SPAN element. The exemplary Browser utilizes the Visual Basic "Split" function, with the space character as delimiter, to isolate words. One skilled in the art would understand the Split function, and that there are a variety of ways to isolate words. This appears to function well, since Microsoft's current Browser Technology typically changes multiple spaces and tabs into one space (text within the PRE element may be an exception). In a variation, a methodology other than using the space character as delimiter may be employed to isolate/encapsulate words. Additionally, the term "words" currently includes any adjacent non-space characters, such as punctuation. In a variation, functionality may be added to remove these adjacent characters as well.

One skilled in the art would know how to replace each text node in appropriate text-containing elements with a series of SPAN elements, each containing one word from the text node. In the exemplary Browser, this is accomplished by: retrieving each element from the BODY's "all" collection; examining the element for child nodes which are text nodes; for each text node that is found, creating an array of words using the Split function; for each word, inserting a SPAN element in its appropriate position before the text node (stepping backwards through the array works nicely) and inserting a word from the array as the innerText of the SPAN element; when this is complete, the original text node is removed. These SPAN elements are also assigned an ID, for subsequent identification purposes. The createElement, insertBefore, and removeChild DOM methods may be used, as would be understood by an individual skilled in the art.

In one variation, only references to appropriate "text-containing" elements are retrieved and examined, using the "tags" method of "all" collection on the BODY of the document. In another variation, a recursion method is used to access all nested elements within the BODY of the document, and appropriate elements are searched for text nodes.

Within HTML manipulation routines and other HTML handling routines, the exemplary Browser makes judicious use of the Visual Basic construct "On Error Resume Next", which would be understood by one skilled in the art. A technique such as this may be useful in handling legacy pages with faulty HTML.

An example of the foregoing manipulation is shown below. Table 4 shows HTML (created for exemplary purposes) before manipulation; table 5 show the HTML after manipulation; and table 6 shows the output of the HTML, which is identical for both cases (of course, the actual output appearance would vary depending upon the window size; additionally, if the HTML was displayed in a browser, and actual images were referenced, they would be displayed in place of the substituted text of Table 6). The inventor has found that occasional anomalies occur as a result of the HTML manipulation, such as, for example, a paragraph being shifted down. In each case which was examined, this appeared to be the result of malformed HTML (such as a nesting error, for example, where a FONT element overlapped a P element), which Microsoft's Browser Technology attempted to repair; the repair included insertion of an additional P.

TABLE 4

```
<BASE HREF="http://www.someaddress.com/">
<!DOCTYPE HTML PUBLIC "-//W3C//DTD HTML 4.0
Transitional//EN">
<html>
<head>
    <title>Untitled</title>
</head>
<body>
<font face=arial,helvetica size=2>
Pictured below is <a href = "javascript://">George Washington</a>, the
first
president of the United States. He was also commander in chief of the
Continental army during
the <a href = "javascript://">revolutionary war</a>.<br>
<a href="javascript://">
<img src="gw.gif" width=100 height=100 border=0 vspace=5 hspace=2
alt="George Washington"></a>
<br><br>
The sixteenth president of the United States was
<a href = "javascript://">Abraham Lincoln</a>,
known as <i>Honest Abe</i>. He was president during the civil war, and
delivered a famous
speech known as the <a href = "javascript://">Gettysburg Address</a>. A
little-known fact is that he was also the only president ever granted a
patent, <a href = "javascript://">U.S. Patent No. 6,469</a>.<br>
<a href="javascript://">
<img src="al.gif" width=100 height=100 border=0 vspace=5
hspace=2 alt="Abraham Lincoln"></a>
</font>
</body>
</html>
```

TABLE 5

```
<HTML><HEAD><TITLE>Untitled</TITLE><BASE
href=http://www.someaddress.com/>
```

TABLE 6

```
<!DOCTYPE HTML PUBLIC "-//W3C//DTD HTML 4.0 Transitional//EN"></HEAD>
<BODY>
<SPAN style="DISPLAY: none">page manipulated</SPAN>
<SPAN><FONT face=arial,helvetica size=2><SPAN><SPAN id=WORD>Pictured
</SPAN>
<SPAN id=WORD>below </SPAN><SPAN id=WORD>is </SPAN>
<SPAN id=WORD></SPAN><A href="javascript://"><SPAN id=WORD>George </SPAN>
<SPAN id=WORD>Washington</SPAN></A><SPAN id=WORD>, </SPAN><SPAN id=WORD>
the </SPAN><SPAN id=WORD>first </SPAN><SPAN id=WORD>president </SPAN>
<SPAN id=WORD>of </SPAN><SPAN id=WORD>the </SPAN><SPAN id=WORD>United
</SPAN>
<SPAN id=WORD>States. </SPAN><SPAN id=WORD>He </SPAN><SPAN id=WORD>was
</SPAN>
<SPAN id=WORD>also </SPAN><SPAN id=WORD>commander </SPAN>
<SPAN id=WORD>in </SPAN><SPAN id=WORD>chief </SPAN>
<SPAN id=WORD>of </SPAN><SPAN id=WORD>the </SPAN><SPAN id=WORD>Continental
</SPAN><SPAN id=WORD>army </SPAN><SPAN id=WORD>during </SPAN><SPAN
id=WORD>
the </SPAN><SPAN id=WORD></SPAN><A href="javascript://"><SPAN id=WORD>
revolutionary </SPAN><SPAN id=WORD>war</SPAN></A><SPAN id=WORD>.</SPAN>
</SPAN><BR><SPAN><A href="javascript://"><IMG alt="George Washington"
border=0 height=100 hspace=2 src="images/gw.gif" vspace=5 width=100></A>
<SPAN id=WORD> </SPAN><SPAN id=WORD></SPAN></SPAN><BR><BR><SPAN><SPAN
id=WORD>
The </SPAN><SPAN id=WORD>sixteenth </SPAN><SPAN id=WORD>president </SPAN>
<SPAN id=WORD>of </SPAN><SPAN id=WORD>the </SPAN><SPAN id=WORD>United
</SPAN>
<SPAN id=WORD>States </SPAN><SPAN id=WORD>was </SPAN><SPAN id=WORD></SPAN>
<A href="javascript://"><SPAN id=WORD>Abraham </SPAN><SPAN id=WORD>
Lincoln</SPAN></A><SPAN id=WORD>, </SPAN><SPAN id=WORD>known </SPAN>
<SPAN id=WORD>as </SPAN><SPAN id=WORD></SPAN><I>
<SPAN id=WORD>Honest </SPAN><SPAN id=WORD>Abe</SPAN></I><SPAN id=WORD>.
</SPAN><SPAN id=WORD>He </SPAN><SPAN id=WORD>was </SPAN><SPAN id=WORD>
president </SPAN><SPAN id=WORD>during </SPAN><SPAN id=WORD>the </SPAN>
<SPAN id=WORD>civil </SPAN><SPAN id=WORD>war, </SPAN><SPAN id=WORD>
and </SPAN><SPAN id=WORD>delivered </SPAN>
<SPAN id=WORD>a </SPAN><SPAN id=WORD>famous </SPAN><SPAN id=WORD>speech
</SPAN><SPAN id=WORD>known </SPAN><SPAN id=WORD>as </SPAN><SPAN
id=WORD>the
</SPAN><SPAN id=WORD></SPAN><A href="javascript://"><SPAN id=WORD>
Gettysburg </SPAN><SPAN id=WORD>Address</SPAN></A><SPAN id=WORD>. </SPAN>
<SPAN id=WORD>A </SPAN><SPAN id=WORD>little-known </SPAN><SPAN
id=WORD>fact
</SPAN><SPAN id=WORD>is </SPAN><SPAN id=WORD>that </SPAN><SPAN id=WORD>he
</SPAN><SPAN id=WORD>was </SPAN><SPAN id=WORD>also </SPAN><SPAN
id=WORD>the
</SPAN><SPAN id=WORD>only </SPAN><SPAN id=WORD>president </SPAN>
<SPAN id=WORD>ever
</SPAN><SPAN id=WORD>granted </SPAN><SPAN id=WORD>a </SPAN><SPAN id=WORD>
patent, </SPAN><SPAN id=WORD></SPAN><A href="javascript://"><SPAN id=WORD>
U.S. </SPAN>
<SPAN id=WORD>Patent </SPAN><SPAN id=WORD>No. </SPAN><SPAN
id=WORD>6,469</SPAN>
</A><SPAN id=WORD>.</SPAN></SPAN><BR><SPAN><A href="javascript://">
<IMG alt="Abraham Lincoln" border=0 height=100 hspace=2
src="images/al.gif"
vspace=5 width=100></A><SPAN id=WORD>
</SPAN><SPAN id=WORD></SPAN></SPAN></FONT></SPAN></BODY></HTML>
```

Pictured below is George Washington, the first president of the United States. He was also commander in chief of the Continental army during the revolutionary war.

Image of George Washington

The sixteenth president of the United States was Abraham Lincoln, known as Honest Abe. He was president during the civil war, and delivered a famous speech known as the Gettysburg Address. A little-known fact is that he was also the only president ever granted a patent, U.S. Pat. No. 6,469.

Image of Abraham Lincoln

The methodology for speaking the text on a page is now described. Three events are of importance here: onmouseover, onmouseout, and onclick.

When the mouse is clicked on an HTML document (page or frame) which is displayed in the exemplary Browser, the "onclick" event handler within the corresponding instance of the DocumentHandler module is called. The onclick handler first checks to determine if the document corresponds to an application HTML page and, if so, responds accordingly, as previously described. If not, it checks to see if the source element type is SPAN, with an ID indicating that it is a word. One skilled in the art would know how to determine the source element type (i.e. the name of the element type over which the mouse cursor was positioned at the time of a click or other mouse event) and ID. If so, it calls the SPEAK method of Microsoft Agent, specifying the Merlin character, and passes it the innerText text string of the associated SPAN source element. The single word within the SPAN element is then pronounced by Merlin. An individual skilled in the art would understand how to instantiate and utilize Microsoft Agent from within a host application. Alternatively, the innerText of the SPAN element could be checked, for example by using the Visual Basic Split function, to see if it only contains one word and, if so, cause it to be pronounced. In another alternative, no checking may be necessary, because since every word may be encapsulated by a SPAN element, the presumption that when a SPAN element receives a mouse event, it is a word-containing element may produce adequate results. In another alternative, a different text to speech synthesizer could be used. One skilled in the art would know that there are various ways to "synthesize speech", including, for example, creating pronunciations from phonemes, near one end of the spectrum, to reciting chunks of recorded speech at the other end.

When the mouse cursor moves over an HTML document (page or frame) which is displayed in the exemplary Browser, the "onmouseover" event handler within the corresponding instance of the DocumentHandler module is called. The onmouseover handler first checks to determine if the document corresponds to an application HTML page and, if so, responds accordingly, as previously described. If not, it checks the source element type, and responds accordingly. The most complex element to handle may be the SELECT object, and it is discussed first, as it also enters into subsequent discussion.

The SELECT element, as would be known to one skilled in the art, displays a default entry, and contains a drop down menu of alternative entries. The alternative entries are contained within OPTION elements. The innerText of the SELECT element contains a concatenation of the innerText of all the associated OPTION elements. Additionally, it appears to continually generate mouseover and mouseout events while the mouse cursor resides over it, moving even slightly. The text which is displayed corresponds to the currently "selected" OPTION. One skilled in the art would know how to determine the contained text string of the currently selected OPTION. If the cursor is first entering the SELECT object, this text string is determined, and passed to the speech synthesizer for articulation. This text string is then recorded in a string variable, and the index of the selected option is also recorded. Additionally, the fact that the SELECT object was the last object to receive a mouseover event is recorded. If a subsequent mouseover event is generated for a SELECT element, the selected text is only articulated if the mouse has exited and re-entered the element. The onmouseover and onmouseout event handlers manipulate the appropriate indicators such that the program can determine when a SELECT element is first entered. One skilled in the art would know how to construct code to perform such manipulation.

The other source element types that are currently handled by the exemplary Browser include SPAN, IMG, AREA and INPUT. Alternatively, virtually all element types may be handled. But since the exemplary Browser encapsulates substantially all words in SPAN elements, passing a mouse cursor over substantially any word causes an event to be generated, with SPAN as the source element type. (Parent elements in the document hierarchy may generate events for the same word as well.) In a variation, events for selected other element types may be handled.

When an IMG or AREA element is the source of a mouseover event, the text of ALT attribute of the element, if any, is passed to the synthesizer. One skilled in the art would understand that the ALT attribute/property may contain text associated with an image displayed by an IMG or AREA element.

When an INPUT element of type SUBMIT or type TEXT is the source of a mouseover event, the text of the associated VALUE attribute is passed to the synthesizer. One skilled in the art would know how to access ALT and VALUE attributes/properties. Alternatively, INPUT elements of other types may be handled as well.

When a SPAN element with an ID indicating that it encapsulates a word is the source of a mouseover event, the parent element is determined, and appropriate action taken. In many cases—the "default" case—the innerText of the parent element is passed to the speech synthesizer. Alternately, a recursive technique may be employed to accumulate the text contained within the parent and all its nested descendents into a string variable, and then pass that string to the synthesizer. Utilization of the innerText property retrieves text in nested chunks. A recursion technique retrieves text from left to right. The innerText of an element includes the innerText of all its descendents. Thus, if the parent element of the SPAN is, for example, another SPAN element; for example, a SPAN element which was previously inserted to encapsulate a contiguous text unit, and this SPAN element also contains hyperlinks (A elements), the innerText of the parent SPAN also includes the text within the hyperlinks, and that entire text chunk of contiguous text is passed to the speech synthesizer. If the parent of the SPAN is, for example, an A element, the text within the hyperlink is passed to the synthesizer.

The action taken when a SPAN element—with an ID (or other indicia) indicating that it encapsulates a word—is the source of a mouseover event is as follows: if the parent element is B, BIG, CAPTION, CITE, EM, FONT, I, NOBR, SMALL, STRONG, or U (these are interpreted as indicating "special" words), the parent type of these elements is determined. Alternately, a different set of elements may be interpreted as indicating "special" words. If the parent of these elements is an A, indicating a hyperlink, the source element's parent's innerText is passed to the synthesizer. This causes the effect of articulating an entire hyperlink as one unit, even though it may include other "special" text. If the parent of these elements is not an A, it is treated in the same manner as the default.

With respect to a SPAN with an ID (or other indicia) indicating that it encapsulates a word, action is taken to determine if its parent element, for example, another SPAN element which was previously inserted to encapsulate a contiguous text unit, contains a nested SELECT element. This is accomplished by looping through the "all" collection of the SPAN element, using the "tags" method with "SELECT" as the tagname. An individual skilled in the art would know how to do this. (Determining whether the source's parent contains a SELECT is actually the first determination that is made. If it does not, other possibilities are tested for.) If a SELECT is found, a copy of the entire parent SPAN element is made, using the cloneNode DOM method. An individual skilled in the art would understand this method. The original element and its clone are virtually identical, except in one important aspect: the SELECT elements of the original indicate the actual selected OPTION, whereas the SELECT elements of the clone indicate the default selected OPTION as the selected option. This is rectified via looping through the "all" collections of the original parent SPAN and its clone in parallel, and for each SELECT element that is found, modifying the associated OPTIONS so that the cloned SELECT contains the same selected OPTION as the original.

Once this is complete, the process loops through the cloned element, using the "tags" method on the "all" collection to obtain references to each SELECT object. For each SELECT found, the innerText of its selected OPTION is copied to a string variable. Then, a SPAN element is created, using the createElement DOM method, its innerText is set to the text of the string variable, and the SELECT element is replaced by this SPAN element, using the replaceNode DOM method. Once this process is complete, the innerText of the cloned SPAN element is passed to the speech synthesizer. An individual skilled in the art would understand these methods, and would be able to write code to implement this functionality.

Alternatively, a recursive technique may be employed to begin accumulating, from left to right, the text contained within the parent SPAN element and all its nested descendents into a string variable; when a SELECT object is encountered in this process, however, the text of its selected OPTION is accumulated instead; and then the recursion continues. At the termination of this process, the string variable should contain the appropriate text, which may be passed to the speech synthesizer.

When the mouse cursor moves out of an HTML element which is displayed in the exemplary Browser, the "onmouseout" event handler within the corresponding instance of the DocumentHandler module is called. The omnouseout handler first checks to determine if the document corresponds to an application HTML page and, if so, responds accordingly, as previously described. If not, the handler checks the source element type, and responds accordingly. If the element is SELECT, the handler manipulates indicators, as mentioned above, as part of a determination process to decide when a mouse cursor has actually entered and/or exited a SELECT object. The main function of the onmouseout event handler is to stop the articulation of text. An individual skilled in the art would know how to accomplish this.

The onclick, onmouseover, and onmouseout handlers also cooperate in maintaining information regarding the previous mouse action. This allows the exemplary Browser to determine, for example, that a click event previously caused a word to be articulated in isolation. This information is used, for example, within the onmouseover event handler, to decide whether to begin articulation if a word is moused over. If, for example, the mouse cursor had been moved from one word to an adjacent word within the same contiguous text unit, and the text was already in the process of being articulated, it would be desirable to allow the articulation to simply proceed, which is what occurs. On the other hand, if the cursor had been moved to the same adjacent word, but the previous word had been clicked, the articulation of the text unit would have been superceded by the articulation of the clicked word. In that case, articulation of the appropriate text is initiated.

The forgoing is now summarized with respect to tables 4–6. The HTML of table 4 contains a FONT element, which contains a number of other elements. The text of this HTML was constructed for example purposes, but its format is indicative of legacy HTML, and was, in fact, based on HTML that the exemplary Browser encountered on a commercial web site. The construct href="javascript://" is used for example only. If this were a real link, a URL would be present; also, "www.someaddress.com" is used for example only.

Table 6 indicates 2 contiguous text units: 2 short paragraphs separated by an image, with the second paragraph above a second image. Each paragraph pertains to the image below it. The original HTML underlying table 6 is shown in table 4. The FONT element of table 4 begins with a text node "Pictured below is"; followed by an anchor node with the text "George Washington"; followed by a text node with", the first president of the United States. He was also commander in chief of the Continental army during the "; followed by an anchor node containing the text "revolutionary war", followed by a text node containing a "."; followed by a terminator node "<BR>".

Table 5 represents the HTML generated from the HTML of table 4 by the exemplary HTML manipulation technique. It may be observed that in table 5, the <FONT> tag is immediately followed by a <SPAN> tag, and there is a closing </SPAN> tag just before the <BR>. This encapsulates the first contiguous unit of text. Additionally, each word is also encapsulated within a SPAN element, with an ID=WORD. Alternatively, a different ID may be used. Alternatively, a different technique may be used to determine that a SPAN element contains one word.

If one of the "normal" words in the first paragraph is moused over, for example, if a user moves the cursor down over the word "first", a mouseover event may occur with the source element being the SPAN element that encapsulates the word "first". In response to this, the innerText of the parent element, another SPAN, is passed to the synthesizer, and entire paragraph begins to be articulated. If the cursor is then moved to the adjacent word "president", a mouseover event will be generated for its encapsulating SPAN, but since they both have the same parent, the ongoing articulation will proceed uninterrupted. If, however, the user then clicks the mouse on "president", the ongoing articulation will be stopped, and the word "president" is articulated in isolation. If the cursor is then moved back to the word "first", the paragraph again begins to be articulated. If, during this articulation, the word "George" in the link "George Washington" is moused over, a mouseover event will be generated with the SPAN encapsulating "George" as the source of this event. In response to this, the ongoing articulation will be interrupted, and the innerText, "George Washington", of the parent element, in this case an A element, will be articulated.

Resuming Speech Output

The exemplary Browser provides an easy-to-use mechanism to resume speech that has been stopped, at substantially the same point where it left off. This can be particularly useful if, for example, a user is listening to a lengthy paragraph, and inadvertently moves the mouse to an area such that the text which is being articulated is passively deindicated. In response to this action, the onmouseout event handler will fire, and the ongoing articulation will be stopped.

In this case (as well as others), if the user wishes the articulation to resume, he or she may simply click the mouse on the background of the web page which is being displayed, and the articulation will resume, substantially at the same place where it was stopped.

Alternatively, a different action could be used to trigger the articulation to resume. One skilled in the art of programming and programmatically manipulating sound, particularly text to speech, could readily utilize an on-screen control, for example, to trigger this action.

The method by which exemplary Browser, which utilizes Microsoft Agent text-to-speech technology, handles this, is now described.

When a user, by moving the mouse (or other input device) passively indicates an object containing text (or any object), the onmouseover event fires. If the object is a speakable object, such as an object containing text or an image with an ALT tag, for example, as previously described, the associated text string is spoken, by invoking the SPEAK method of Microsoft Agent, specifying the Merlin character, and passing to the method the text string appropriate to the object which has been indicated.

Prior to the SPEAK method being called, however, "bookmarks", as they are known in Microsoft Agent parlance, are inserted into the text string. A bookmark is a Microsoft Agent output tag of the form \Mrk=number\. One skilled in programming Microsoft Agent would understand output tags. The exemplary Browser currently appends one bookmark tag to every word in the text string prior to invoking the SPEAK method in response to passive indications. The tags are text strings and there are many ways to insert one text string into another as known to those skilled in the art of programmatically manipulating text strings. The exemplary Browser uses the Visual Basic "split" function to divide the string into an array of individual words, then, loops through this array, adding, among other things, bookmark tags to each word, and then uses the Visual Basic "join" function to reconstruct the original string with the bookmarks inserted. One skilled in programming Visual Basic would understand these functions.

If an object associated with the sentence: "The quick brown fox jumps over a lazy dog." was passively indicated, for example, it would be modified to: "The\Mrk=1\quick\Mrk=2\ brown\Mrk=3\ fox\Mrk=4\ jumps\Mrk=5\ over\Mrk=6\ a\Mrk=7\ lazy\Mrk=8\ dog.\Mrk=9\" before being passed to the SPEAK method.

The Visual Basic code used by the exemplary Browser to keep track of spoken text, so that is can be resumed, consists of three sections: first, a means for bookmarking and saving text which is about to be spoken; second, an event handler which receives bookmark events that are generated by Microsoft Agent, and which tracks the progress of the spoken output (whenever Microsoft Agent encounters a bookmark as it is articulating a text string, it calls an event handler, passing it the number of the bookmark encountered); and third, code for the onclick event handler to determine the context of the click and, under the correct circumstances, cause a stopped articulation to resume. Additionally, the onmouseout event handler needs to determine whether, upon an onmouseout event, to stop articulating text, or in the case of text which has been resumed, allow it to proceed unless interrupted by another articulation-producing event. Exemplary code for the first section is shown in Table 7

TABLE 7

```
lastStr = str
resumeFlag = False '__new__ text is about to be spoken
Merlin.Stop
mark = 0
Merlin.Speak (str)
``` where "str" is a string variable containing the bookmarked text to be spoken, "lastStr" is a global string variable which holds a copy of this text, "resumeFlag" is a global Boolean variable, which is used within the onmouseout event handler to determine whether or not to stop spoken output, and "mark" is global Long variable which is initially set to zero, and updated within the bookmark event handler as articulation of text progresses. Exemplary code for the second section is shown in Table 8.

TABLE 8

```
Private Sub Agent1_Bookmark(ByVal BookmarkID As Long)
'set global variable to track articulation
' 'mark' receives the number of the most recent bookmark processed
'by Microsoft Agent
    mark = BookmarkID
End Sub
```

Exemplary code for the third section is shown in Table 9.

TABLE 9

```
If mark = 0 And lastStr <> "" Then    'if mark is still zero, and lastStr
    frm.Merlin.Speak lastStr          'not null, speak entire sring
    Exit Function
End If
If mark > 1 Then                      'if mark > 1, reduce by 1 so articulation will
    mark = mark - 1                   'start one word back and provide some context
End If
mrk = "\mrk=" & mark & "\"            'create mrk tag to search for in lastStr
i = InStr(1, lastStr, mrk, vbTextCompare)  'look for occurence of
                                           'specified mrk tag
If i < 1 Then                         'if tag not found, then a new articulation may
    Exit Function                     'have started; so exit
End If
str = Mid(lastStr, i)                 'extract substrng beginning with the correct
                                      'bookmark
frm.Merlin.Stop                       'to be safe
If lastStr <> "" Then                 'to be safe, again
    resumeFlag = True                 'set for onmouseout handler
    frm.Merlin.Speak str              'resume previously stopped articulation
End If
```

This code is contained within the onclick event handler. It executes if it is determined (by code not shown) that the click occurred outside a SPAN element with ID indicating it was a word, (had this been the case, the word would have been articulated in isolation), and outside an input field. In a variation, other HTML elements are also excluded from resuming articulation in response to being clicked.

As indicated by the comments, articulation of previously stopped text will be resumed at one word prior to the word the appended bookmark of which triggered the last bookmark event. Or, in the case where no bookmark events have been fired, the entire previously articulated text string will be articulated.

The main function of the onmouseout handler is to stop an ongoing articulation. However, there are circumstances where this is not desirable. For example, if a user moves the mouse cursor from one word to another within a contiguous unit of text, it would not be desirable. Thus, situations such as this are checked, and handled appropriately. Basically, if the mouse cursor passes from one element to another, and indication of both elements would cause articulation of the identical text, the articulation is not stopped. An individual with skill in DHTML and DOM techniques would be able to determine parent-child and sibling relationships of nested and adjacent elements (or nodes, in DOM parlance), and the text associated with the respective elements.

If it is determined that there is no reason to allow an articulation to continue, it is stopped within the onmouseout event handler, using the STOP or STOPALL Microsoft Agent methods. One such reason not to stop an ongoing articulation, if no other reasons are present, is if the resumeFlag is set to True. If the resumeFlag is set to True, the onmouseout event handler will not stop an ongoing articulation. This creates a situation where a resumed articulation is not stopped simply because a user moves the mouse cursor from one background area of a document to another, and the areas happen to contain different underlying HTML elements (thus triggering onmouseout and onmouseover events), neither of which would cause the exemplary Browser to commence an articulation. (For example, a text-containing FONT element, nested within a BLOCKQUOTE element, nested within a CENTER element, nested within the BODY of the document, with several BR tags surrounding each nested element would cause onmouseout events to occur as the mouse moved across the background of the document.) This resumed articulation will be stopped, and another one started, however, if the cursor enters an object that causes the Browser to commence a new articulation (or in response to other articulation-producing actions) because a STOP method is invoked prior to a SPEAK method for text articulated in response to passive indications, as well as other articulation-producing events.

VARIATIONS

The exemplary Browser, as previously discussed, provides children and other users who may be able to access a language in its spoken form, but not its orthographic form, the ability to navigate textual documents in a way that approaches that of literate adults. This is a general technique, however, and may be implemented in a variety of different ways.

In one variation, any document of a textual nature that is in, or can be transformed into an electronic document, can be navigated. The document could be input, for example, by a Visual Basic program and displayed in a picture box control. The program could keep track of the X and Y coordinates corresponding to, for example, each word, each line, each sentence, each delimited clause, each paragraph, each list item, each bullet point, and each chunk of contiguous text. An individual skilled in the art would understand how to keep track of the X and Y coordinates of the displayed text. Further, if the document is produced using a markup language, or other format with which typefaces and other "special" words can be distinguished, these can be tracked as well (so long as the markup language or format is determinable). Then, when a user places a mouse cursor over, for example, a paragraph, a heading, or a list item, only that text is spoken. If a user clicks on a word, the word is spoken. If a markup or formatting language is utilized, or some other means of allowing the program to distinguish typefaces, word groups of a special typeface or that differ in some way could be articulated separately in response to a passive indication.

In another variation, screen OCR may potentially be utilized. For example, Structu Rise, at http://www.structurise.com, has developed a technique called "Direct Klepting technology." An excerpt form their web page states that "Direct Klepting technology allows to capture text from Windows 98/95/NT screen. Optical character recognition (OCR) engine is the base for this technology. It detects characters in the raster image and defines their precise properties: location, font face, style and size." Utilizing a technique such as this, onscreen text may be captured, then re-displayed and articulated as described in the previous variation. Alternatively, contiguity and special text with respect a mouse position may potentially be recognized and articulated on-the-fly. This may require a rather fast processor. A technique such as this would have the advantage of being able to "understand" text within bitmapped images.

In another variation, on-screen text and associated cursor position may be tracked via use of an off-screen-model, such as employed by screen readers for blind individuals. An individual skilled in the art would know how to create an appropriate off-screen-model representative of on-screen text, and this is generally discussed in an article entitled "Making the GUI Talk," by Richard S. Schwerdtfeger, Byte Magazine, December 1991, page 118. The exemplary textual navigation technique could be implemented, for example, by utilizing a technique similar to this, to determine the contiguity of text, individual words, and special words, which would then be articulated according the exemplary textual navigation technique.

With respect to the exemplary Browser, in one variation, the articulation of INS objects are preceded by the following articulation: "The following text is to be inserted"; and the articulation of DEL object is preceded by : "The following text is to be deleted".

In another variation, articulation of elements indicating special text, such as, for example italics, bold, or underlined text, or, additionally, other items, such as list items, are preceded by articulation indicating the nature of the item. This may be useful for learning the meaning of these constructs for a child, or useful as an indication for an person with an impairment, such as impaired vision.

In another variation, articulation of text within an HTML or similar document may be inhibited until the document's HTML has been manipulated.

In another variation, articulation of text within an HTML or similar document may commence before the HTML is manipulated.

In another variation, if the articulation of text within an HTML or similar document commences before the HTML is manipulated, alternative source elements may be handled within the mouse event handlers.

In another variation, the articulation of text within an HTML or similar document may be handled using one technique prior to manipulation, and another technique subsequent to manipulation.

In another variation, manipulation of the HTML may commence before the document is completely loaded.

In another variation, HTML manipulation to encapsulate contiguous text units may be largely replaced by checking for text terminators within the onmouseover event handler. In this variation, a recursion method may be utilized, wherein the parent elements of SPANs containing single words are recursively searched for nested text/text containing elements until a terminator is encountered, accumulating a left-to-right text string as the recursion proceeds. When a terminator is encountered, the accumulated text is passed to a speech synthesizer.

In another variation, the act of encapsulating single words may be replaced with a technique within the onclick event handler which is able to determine the clicked word. This may utilize DHTML font properties, combined with DHTML properties which reveal the X and Y coordinates of the cursor position on a mouse event.

In another variation, in conjunction with an appropriate speech synthesizer, text within emphasized elements may be so indicated to the synthesizer, so that it is articulated with emphasis.

In another variation, clicking on a normal word may cause action other than/or in addition to articulation, such as, for example, having the clicked word spelled out loud; having its meaning pronounced; displaying and pronouncing a synonym; producing an activity related to the word, and so on. One skilled in the art would understand how to invoke a specified action in response to receiving a word. One skilled in the art would also know how to construct a menu of choices such that the user may decide upon the action; in particular, indicting choices using the exemplary pervasive and immediate articulation technique.

With respect to resuming articulation of text, in one variation, a text to speech engine that accepts "pause" and "resume" commands could be utilized, in which case, bookmarks would not be necessary. It is believed that such engines exist; if not, such an engine could be built.

In another variation, the time a text-to-speech articulation was started and stopped could be recorded. In this variation, the rate of the text-to-speech engine could be used to calculate the approximate number of words that had been articulated, and the resumption speech could occur from several words prior to the calculated word.

In another variation, additional controls could be utilized to mimic features typically associated with digital audio, such as skip and search (forward and backward), random access, and so on. One skilled in the art of programmatically manipulating text-to-speech engines and accepting input from visual onscreen or keyboard controls would be able to implement such functionality. This could be useful if a user wishes to have a portion of text repeated, omitted, and so forth.

In another variation, bookmarks are not appended to every word, but to larger chunks of text.

In another variation, a means is provided whereby the user may select the frequency of bookmarks and, irrespective of the text-to-speech engine used, select the starting point for resumed audio, for example, one word prior to where it stopped, two words prior, etc. This would allow the user to tailor the context of the resumed speech to his or her preference.

The exemplary Browser and variations embody techniques which are significant. Children, as well as other individuals who understand a language, but cannot, for one reason or another, access it via its orthographic representation, are provided with the ability to actually navigate virtually any textual information with almost the same ease as a literate adult. This ability opens portals to information which were previously unrecognizable, and allows the user to meander through worlds of knowledge which can be enriching, exciting and enjoyable.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method for the auditory navigation of text, comprising the steps of:
   receiving passive deindication of a displayed articulation-producing object while an articulation of text associated with the object is proceeding;
   responsive to the passive deindication, stopping the articulation;
   receiving an indication, consisting of a mouse click or analogous signal from a pointing device on a background area of a web page, to resume the stopped articulation;
   responsive to the indication, resuming the stopped articulation substantially at the point where it was stopped.

2. A method according to claim 1, wherein passive deindication includes deindication via placement of a pointing device cursor.

3. A method for the auditory navigation of text comprising the steps of:
   receiving a passive deindication of a displayed articulation-producing object while an articulation of text associated with the object is proceeding, the passive deindication including movement of a cursor responsive to corresponding movement of a mouse or other pointing device from the displayed articulation producing object without a mouse click or analogous signal;
   responsive to the passive deindication, stopping the articulation;
   receiving an indication, consisting of a mouse click or analogous signal from the mouse or other pointing device on a background area of a web page, to resume the stopped articulation;
   responsive to the indication, resuming the stopped articulation substantially at the point where it was stopped.

* * * * *